United States Patent [19]
Miyamoto et al.

[11] Patent Number: 5,434,844
[45] Date of Patent: Jul. 18, 1995

[54] MAGNETO-OPTICAL RECORDING MEDIA AND MAGNETO-OPTICAL RECORDING DEVICE USING THE SAME

[75] Inventors: Harukazu Miyamoto, Kodaira; Toshio Niihara, Sayama; Keikichi Andoo, Musashino; Masahiro Ojima, Tokyo, all of Japan

[73] Assignee: Hitachi, Ltd., Tokyo, Japan

[21] Appl. No.: 43,455

[22] Filed: Apr. 6, 1993

[30] Foreign Application Priority Data

Apr. 10, 1992 [JP] Japan .................................. 4-090433
Sep. 18, 1992 [JP] Japan .................................. 4-249817

[51] Int. Cl.$^6$ ............................................. G11C 13/06
[52] U.S. Cl. ................................. 369/275.2; 369/283
[58] Field of Search ................ 369/13, 283, 284, 286, 369/275.1, 275.2; 360/114

[56] References Cited

U.S. PATENT DOCUMENTS

| | | | |
|---|---|---|---|
| 5,094,925 | 3/1992 | Ise et al. | 369/13 |
| 5,175,714 | 12/1992 | Kititsu et al. | 360/114 |
| 5,224,068 | 6/1993 | Miyake et al. | 369/13 |

FOREIGN PATENT DOCUMENTS 62-175948  8/1987  Japan .
63-64651   3/1988  Japan .

Primary Examiner—Paul M. Dzierzynski
Assistant Examiner—Don Wong
Attorney, Agent, or Firm—Pennie & Edmonds

[57] ABSTRACT

This invention provides a magneto-optical recording medium comprising at least an information storage layer and a readout layer disposed on the substrate, the information storage layer being used to record information by changing the magnetized state by raising the temperature thereof by light irradiation, and the readout layer being capable of copying information recorded on the above-mentioned information storage layer, located closer to the substrate than the above-mentioned information storage layer, and having a coercive force of 3 kOe or less at room temperature. By using this recording medium, a Signal to Noise ratio can be obtained in reproduction without deterioration of the information recording characteristics.

9 Claims, 18 Drawing Sheets

↓ H$_{INI}$

↓ H$_{INI}$

↑ H$_O$

↑ H$_O$

↓ H$_R$

↓ H$_R$

LASER

FREQUENCY

MAGNETO-OPTICAL RECORDING MEDIA AND MAGNETO-OPTICAL RECORDING DEVICE USING THE SAME

BACKGROUND OF THE INVENTION

This invention relates to a magneto-optical recording medium for recording information by varying the state of magnetization of an information storage layer by raising its temperature by irradiating light to the recording medium including the information storage layer, and reproducing the information that is recorded by irradiating light to the above-mentioned recording medium by application of the magneto-optical effect, and also relates to a magneto-optical recording device using the above-mentioned recording medium.

Furthermore, this invention relates to a magneto-optical recording medium capable of overwriting the previously stored information with a single light beam, and also relates to a magneto-optical recording and reproducing device using the magneto-optical recording medium.

The ordinary magneto-optical recording medium of the prior art has a cross sectional structure shown in FIG. 13, for example. This magneto-optical recording medium is formed by successively laminating a dielectric layer 52 (about 90 nm thick) of a silicon nitride ($SiN_x$) or the like, an information storage layer 53 (about 100 nm thick) of TbFeCo or the like and a protective layer 54 (about 200 nm thick) of silicon nitride or the like onto a transparent substrate 51 of glass or the like having formed therein grooves for tracking. The dielectric layer 52 causes the laser beam entering from the side of the substrate 51 to undergo multiple reflections inside the dielectric layer 52 and thereby increase the rotation angle (Kerr rotation angle) of the polarization plane of the reflected light produced at the information storage layer 53. The protective layer 54 protects the information storage layer 53 from corrosion, such as oxidation.

The coercive force of the information storage layer 53 has a temperature characteristic shown in FIG. 14. To be more specific, the coercive force is high at room temperature $T_R$, and becomes infinity at compensation temperature $T_{comp}$, and drops near the Curie temperature $T_c$.

The principle of recording and reproducing information on this magneto-optical recording medium is described as follows.

An external magnetic field is first applied to this recording medium to set the magnetization of the information storage layer 53 uniformly in one direction. When recording information, while being applied to a recording magnetic field Hrec (in a direction opposite to the external magnetic field mentioned above) with an intensity shown in FIG. 14, the recording medium is irradiated with the laser beam in pulses. By this laser light irradiation, the temperature of the thus irradiated spots of the recording medium rises, and when the temperature exceeds a specified writing temperature Tw shown in FIG. 14, the coercive force of the information storage layer 53 becomes smaller than the recording magnetic field Hrec. Therefore, the magnetization of the information storage layer 53 mentioned above is reversed to the direction of the writing magnetic field Hrec, so that the recorded domains are formed.

To erase the information recorded as described, the direction of the above-mentioned external magnetic field is reversed and the laser beam is continuously irradiated to the recording medium.

When reproducing information, the laser beam of a lower power than in recording and erasing is irradiated to the recorded domains formed as described, and the Kerr rotation angle of the polarization plane of the reflected light is detected. Since the Kerr rotation angle varies with the presence or absence and the shape and the size of the recorded domains, the information is reproduced according to the Kerr rotation angles detected.

The above-mentioned conventional magneto-optical recording medium is incapable of what is called overwriting. For this reason, there has been proposed an overwritable magneto-optical recording medium which has a cross sectional structure shown in FIG. 15, for example. In this magneto-optical recording medium, a dielectric layer 52 (about 90 nm thick) of silicon nitride or the like is formed on a transparent substrate 51 of glass or the like having grooves for tracking, and onto this dielectric layer 52, a memory layer 53a (about 40 nm thick) of TbFeCo and a writing layer 53b (about 100 nm thick) of TbDyFeCo are laminated. The memory layer 53a and the writing layer 53b constitute an information storage layer 53. A protective layer 54 (about 200 nm thick) of silicon nitride or the like is formed on the writing layer 53b.

Since the thickness of the memory layer 53a is about 40 nm, only a small amount of the readout laser beam irradiated through the substrate 51 can reach the writing layer 53a. For this reason, the polarization plane of the reflected light rotates chiefly reflecting the state of magnetization of the memory layer 53a. The writing layer 53b, which is exchange-coupled magnetically to the memory layer 53a, is used for overwriting with a single beam.

The principle of overwriting on this magneto-optical recording medium will next be described with reference to FIGS. 16 and 17A to 17G. FIG. 16 is a graph showing temperature characteristics of the coercive forces of the memory layer 53a and the writing layer 53b, while FIGS. 17A-17G are diagrams for explaining changes in magnetization of the memory layer 53a and the writing layer 53b when overwriting is done.

As shown in FIG. 16, the temperature characteristics of the coercive forces were arranged such that the Curie temperature Tcm of the memory layer 53a is lower than the Curie temperature Tcr of the writing layer 53b, so that at room temperature $T_R$, the coercive force of the writing layer 53b is smaller than the coercive force of the memory layer 53a. Hence, when an initializing field Hini with an intensity shown in FIG. 16 is applied by a permanent magnet or the like to the information storage layer 53 at room temperature $T_R$, as is apparent from FIGS. 17A and 17B, the magnetization of the writing layer 53b can be directed uniformly in one direction without changing the direction (information) of the magnetization of the memory layer 53a.

When the laser beam of a relatively small intensity (low level) is irradiated to the recording medium having had the magnetization of the writing layer 53b directed uniformly in one direction and the recording medium is raised to a temperature close to the Curie temperature Tcm of the memory layer 53a, the coercive force of the memory layer 53a completely or substantially disappears. At this time, since the Curie temperature Tcr of the writing layer 53b is higher than the Curie temperature Tcm of the memory layer 53a, the direction of the magnetization of the writing layer 53b remains unchanged (FIG. 17C).

As the laser beam irradiation is finished and the temperature of the recording medium drops, the magnetization of the memory layer 53a appears, but the magnetization this time is directed by the exchange field to the same direction as the magnetization of the writing layer 53b (FIG. 17E). This state does not change even when the temperature falls further to room temperature $T_R$. This process is what is called erasing of data.

On the other hand, if, while the recording field Hrec of an intensity shown in FIG. 16 is applied to the recording medium, the laser beam of a relatively high intensity (high level) is irradiated to the recording medium and the recording medium is raised to a temperature close to the Curie temperature Tcr of the writing layer 53b, then the coercive force of the memory layer 53a completely disappears and also the coercive force of the writing layer 53b completely or substantially completely disappears (FIG. D).

Under this condition, when the laser beam irradiation is finished and the temperature of recording medium falls a little, the magnetization of the writing layer 53b first appears. At this time, the direction of the magnetization of the writing layer 53b is reversed to the same direction as the direction of the recording field Hrec (FIG. 17F). As the temperature further falls and becomes lower than the Curie temperature Tcm of the memory layer 53a, the direction of the magnetization at this time becomes the same as the direction of the magnetization of the writing layer 32 (the same direction of the recording field Hrec (FIG. 17G). This state does not change even when room temperature $T_R$ is reached. This process is what is called recording of data.

As has been described, in the magneto-optical recording medium shown in FIG. 15, by modulating the laser beam intensity between high and low levels, the magnetized direction (information) of the memory layer 53a can be changed arbitrarily. In other words, overwriting can be performed with a single beam. This method is disclosed in JP-A-62-175948.

In the prior-art overwritable magneto-optical recording medium shown in FIG. 15, there is a problem that since the memory layer 53a has a low Curie temperature Tcm or has a thin thickness, the Kerr rotation angle of the reflected light is small and therefore, a satisfactory Signal to Noise ratio (SNR) cannot be obtained when reproducing information.

To increase the SNR in reproduction, it has been proposed to add a readout layer (copy layer) which provides the conventional magneto-optical recording medium with a large Kerr rotation angle (Refer to JP-A-63-64651, for example). In this case, however, a problem arises that if the readout layer is increased in thickness, owing to the effects of the magnetization of the readout layer, overwriting cannot be performed in an appropriate manner.

Moreover, in the conventional magneto-optical recording and reproducing method, there is a problem that if information is recorded or reproduced with high density (about 1.5 Gb/in², for example), a sufficient SNR cannot be obtained.

SUMMARY OF THE INVENTION

An object of the present invention is to provide a magneto-optical recording medium which can attain a greater SNR in reproduction than in the prior art without sacrificing the information recording characteristics and a magneto-optical recording device using this magneto-optical recording medium.

Another object of the present invention is to provide magneto-optical recording medium which can obtain a high SNR in recording and reproducing information with a high density of about 1.5 Gb/in² and also a magneto-optical recording device using this magneto-optical recording medium.

(1) The magneto-optical recording medium according to the present invention comprises an information storage layer and a readout layer both formed on a substrate, the above-mentioned information storage layer being used for recording information by changing the state of magnetization thereof by raising the temperature by irradiation of light, the above-mentioned readout layer being capable of copying thereto information recorded in the above-mentioned information storage layer, being disposed on a position closer to the substrate than the information storage layer, and having a coercive force of 3 kOe or less at room temperature.

Since the coercive force of the readout layer is small, the information of the storage layer can be copied quickly and smoothly, so that the quality of the readout signal is improved.

Preferably, the coercive force of the readout layer should be 1 kOe or less at room temperature. When an ordinary electromagnet is used, the maximum intensity of the bias magnetic field to apply to the information recording medium in recording is 1 kOe. So, it is desired that the coercive force of the readout layer is 1 kOe or less. The reason is that when the coercive force is at this level, the direction of the magnetization of the readout layer can be controlled by an external magnetic field without making any great alteration to the device.

(2) In a magneto-optical recording method according to the present invention including the steps of recording information by changing the state of magnetization of an information storage layer by raising the temperature thereof by irradiating light to a recording medium including the above-mentioned information storage layer, and reproducing by applying the magneto-optical effect the information recorded in the above-mentioned information storage layer by irradiating light to the above-mentioned recording medium, comprising the steps of:

providing a readout layer capable of copying thereto the information recorded in the above-mentioned information storage layer and exhibiting a greater magneto-optical effect than does the above-mentioned information storage layer;

magnetically coupling the above-mentioned readout layer with the above-mentioned information storage layer at readout temperature; and magnetically decoupling the above-mentioned readout layer from the above-mentioned information storage layer at writing-temperature.

Magnetic coupling and decoupling of the above-mentioned readout layer from the above-mentioned information storage layer are preferably done by a read control layer comprising a magnetic layer having a Curie point lower than the above-mentioned writing temperature and higher than the readout temperature.

In reproduction, it is preferable to irradiate light with an intensity that changes the state of magnetization of the above-mentioned readout layer and does not change the state of magnetization of the above-mentioned information storage layer. By this arrangement, the resolution in reproduction is improved to enable readout with high density.

(3) Another magneto-optical recording medium according to the present invention comprises an information storage layer for recording information by changing the state of magnetization by raising the temperature by light irradiation; a readout layer capable of copying information recorded in the above-mentioned information storage layer and exhibiting a greater magneto-optical effect than does the above-mentioned information storage layer; and a read control layer for magnetically coupling the above-mentioned readout layer with the above-mentioned information storage layer and magnetically decoupling the above-mentioned readout layer from the above-mentioned information storage layer.

The thickness of the above-mentioned readout layer is preferably 15 nm or more and 60 nm or less, and more preferably 20 nm or more and 50 nm or less. If this thickness is less than 15 nm, the light passes through the readout layer, and reaches the above-mentioned read control layer and the above-mentioned information storage layer, and as a result, the light does not sufficiently interacts with the above-mentioned readout layer, and a sufficient Kerr rotation angle cannot be obtained. If that thickness is greater than 60 nm, it is probable that the shape of the recorded domains of the above-mentioned information storage layer is disturbed by the magnetization of the above-mentioned readout layer. If the thickness of the readout layer is 20 nm or more, a sufficient Kerr rotation angle can be obtained, and if the thickness is 50 nm or less, the shape of the recorded domains of the above-mentioned information storage layer is prevented from being affected.

The above-mentioned readout layer has only to be a type of material which exhibits a greater magneto-optical effect than does the above-mentioned information storage layer. Among the materials used for this purpose are alloys made by mixing a rare-earth metal such as Gd, Tb, Nd, Dy, Pr, Sm or the like with a transition metal such as Fe, Co, Ni or the like. Those alloys may be added with Nb, Ti, Pt, Cr, Ta or Ni to improve the corrosion resistance. In addition, it is possible to use a super-lattice film of Pt/Co, Pd/Co or the like. With those films, the Kerr rotation angle is especially large in the light wavelength range of 200 nm to 600 nm, so that excellent reading characteristics can be obtained.

The coercive force and the magnetization of the above-mentioned readout layer is preferably as small as can reflect with high fidelity the shape of the domains of the above-mentioned information storage layer and do not disturb the shape of the domains. In the magnetic materials having such properties are materials of Gd—Fe—Co system, Gd—Tb—Fe—Co system, Gd—Dy—Fe—Co system, Nd—Dy—Fe—Co system, and Nd—Tb—Fe—Co system and a Pt/Co multilayer film and the like.

The thickness of the above-mentioned read control layer is preferably 2 nm or more and 20 nm or less, and more preferably 5 nm or more and 10 nm or less. If the read control layer thickness is less than 2 nm, the readout layer cannot be controlled accurately, and this thickness is so thin that the effective Curie temperature becomes higher. If the thickness is more than 20 nm, this is so thick that the reading sensitivity deteriorates and the information copying performance of the information storage layer degrades. In addition, the domain shape of the memory layer is likely to be disturbed. If the thickness is in the range of 5 to 10 nm, the difficulties mentioned above can be precluded, and the magnetic coupling and decoupling can be switched over smoothly.

Preferably, the above-mentioned read control layer is formed by a magnetic layer having a Curie temperature lower than the above-mentioned writing temperature and higher than the above-mentioned readout temperature. Among those magnetic layers are alloys formed by mixing a rare-earth metal such as Gd, Tb, Nd, Dy, Pr, Sm or the like with a transition metal such as Fe, Co, Ni, Cr or the like. Those alloys may be added with Nb, Ti, Pt, Cr, Ta, Ni or the like to enhance the corrosion resistance.

Preferably, the above-mentioned information storage layer includes a writing layer which is initialized by the initializing magnetic field and has a small coercive force at room temperature, and a memory layer which has a large coercive force at room temperature, and the information storage layer is contiguous to the above-mentioned read control layer.

When the memory layer and the writing layer mentioned above are provided, a magnetic layer can also be provided which causes the above-mentioned writing layer to be initialized by being magnetized uniformly in one direction. If a magnetic layer is added, it is not necessary to separately provide a magnetic field applying means for initializing the above-mentioned writing layer in a state magnetized uniformly in one direction.

Preferably, the above-mentioned magnetic layer for initialization includes an initializing layer whose magnetization is not reversed by a writing operation, and an initialization control layer for magnetically coupling the above-mentioned initializing layer to the above-mentioned writing layer at the above-mentioned readout temperature, and magnetically decoupling the above-mentioned initializing layer from the above-mentioned writing layer at the above-mentioned writing temperature.

As the initialization control layer, a layer of the same chemical composition as that of the above-mentioned read control layer can be used. The initializing layer has only to be a magnetic layer (TbCo or the like, for example) which can produce a magnetic field equivalent to the initializing magnetic field applied by an external magnet.

The above-mentioned information storage layer (including the memory layer and the writing layer) is preferably formed by an alloy made by mixing a rare-earth metal and a transition metal just like the above-mentioned readout layer.

(4) The magneto-optical recording device according to the present invention comprises a magneto-optical recording medium of (3) mentioned above.

The magneto-optical recording device preferably includes means for irradiating the above-mentioned magneto-optical recording medium with light with an intensity that changes the state of magnetization of the readout layer of the above-mentioned magneto-optical recording medium in reproduction, but does not change the state of magnetization of the above-mentioned information storage layer. Under this arrangement, the resolution in reproduction is improved and high-density reading can be implemented.

(5) In a magneto-optical recording and reproducing method according to the present invention for overwriting information by applying a phenomenon that different pieces of magnetization information are recorded on the magneto-optical recording medium when two kinds of recording beams of different degrees of intensity are irradiated to the magneto-optical recording medium, the improvement comprising the steps of providing a magneto-optical recording medium including an information storage layer and a readout layer laminated together on a substrate, the information storage layer and the readout layer being mutually coupled magnetically at room temperature, and the magneto-optical recording medium having a characteristic where $T_{C1} < T_{C2}$, $H_{C1} > H_{C2}$ when Curie temperatures of the information storage layer and the readout layer are denoted respectively by $T_{C1}$ and $T_{C2}$ and the coercive forces thereof at room temperature are denoted by $H_{C1}$ and $H_{C2}$; irradiating a readout beam to the above-mentioned readout layer while applying a bias field different at least in either one of the direction and the intensity in reproduction from the bias field in recording; and reading the magnetization information while copying the magnetization information recorded in the above-mentioned information storage layer to the above-mentioned readout layer by the above-mentioned readout beam irradiation.

Preferably, the direction of the bias field to be applied in reproduction is opposite to the direction of the bias field to be applied in recording, and the intensity of the bias field to be applied in reproduction is greater than the intensity of the bias field to be applied in recording. However, the direction and the intensity of the readout bias field are not limited to those described above, but other choices may be made so long as both the direction and the intensity of the readout bias field are not the same as those of the recording bias field.

When the two bias fields of the same intensity are used, it is only necessary to differentiate the directions of the those bias fields. For example, it is possible to direct one bias field downward and the other bias field upward. On the other hand, when the two bias fields in the same direction are used (both directed upward, for example), the intensity of the two bias fields has only to be differentiated. Both the directions and the intensity of the two bias fields may be differentiated. In short, when the readout beam is irradiated to the above-mentioned readout layer while applying a readout bias field which differs in direction or intensity from the recording bias field, it is only required that the magnetization information recorded in the above-mentioned information storage layer should be able to be copied to the above-mentioned readout layer.

The recording bias field may be set so as to have an intensity most appropriate to overwriting.

It is desired that before writing or reading, the direction of the magnetization of the above-mentioned readout layer should be arranged uniformly in one direction. By this arrangement, it is possible to use the same magneto-optical recording and reproducing method as the prior art described earlier.

The readout beam is preferably irradiated from the side closer to the above-mentioned readout layer. This irradiation method ensures a greater intensity of the beam irradiated to the above-mentioned readout layer than in the irradiation from the side of the above-mentioned information storage layer, so that better effects can be obtained.

The intensity of the above-mentioned readout beam is preferably set at more than 0.8 times the intensity of the recording beam, by which the degree of allowance in setting each beam is widened, making stable overwriting possible. Also, it is possible to perform reading with a high S/N ratio.

The wavelength of the above-mentioned readout beam is preferably set so as to be shorter than the wavelength of the above-mentioned recording beam. By this setting, even if the recorded domains are small in size, information can be read out unfailingly, and recording with higher density can be realized. Then, the readout beam and the read after write beam need not have so high an intensity.

The above-mentioned readout beam is preferably irradiated to the above-mentioned magneto-optical recording medium through a lens separate from the lens for the above-mentioned recording beam. By so doing, it becomes easy to irradiate bias fields different in intensity or direction to the positions of the above-mentioned recording beam and readout beam. In this case, it is not necessary to change the intensity of or reverse the direction of the magnetic fields, and therefore, as means for generating the above-mentioned bias fields, a permanent magnet or the like can be used.

The coercive force of the above-mentioned information storage layer should preferably be much greater than the coercive force of the above-mentioned readout layer at room temperature. By so doing, it becomes possible that before recording information, by applying an initializing field of an appropriate intensity to the magneto-optical recording medium, the magnetization direction of the readout layer is set uniformly in one direction. What is called the "initializing field of an appropriate intensity" above is a magnetic field witch an intensity smaller than the coercive force of the information storage layer and greater than the coercive force of the readout layer.

(6) In another magneto-optical recording and reproducing device according to the present invention for overwriting information by applying a phenomenon that different pieces of magnetization information are recorded on the magneto-optical recording medium, comprising:

an info,nation storage layer and a readout layer together laminated on a substrate, the information storage layer and the readout layer being mutually coupled magnetically at room temperature;

a magneto-optical recording medium, including said information storage layer and said readout layer, the magneto-optical recording medium having characteristics of $T_{C1} < T_{C2}$, $H_{C1} > H_{C2}$ when Curie temperatures of the information storage layer and the readout layer are denoted respectively by $T_{C1}$ and $T_{C2}$ and the coercive forces thereof at room temperature are denoted by $H_{C1}$ and $H_{C2}$;

means for applying a bias field different in at least either one of the direction and the intensity in reproduction from the direction and the intensity thereof in recording; and means for irradiating the reading and recording beams to the above-mentioned magneto-optical recording medium, wherein the readout beam is irradiated to the above-mentioned readout layer in reproduction while applying a bias field different in at least either one of the direction and the intensity from the bias field in recording, and the magnetization information is read out while copying the magnetization information recorded in the above-mentioned information storage layer to the readout layer by the abovementioned readout beam irradiation.

Preferably, the direction of the bias field to be applied in reproduction is opposite to the direction of the bias field to be applied in recording, and the intensity of the bias field to be applied in reproduction is greater than the intensity of the bias field to be applied in recording. However, the direction and the intensity of the bias field to be applied in reproduction are not limited to those described above, but may be any choice so long as both the direction and the intensity of the bias field are not the same as those in recording.

Preferably, there is provided means for setting the magnetization direction of the above-mentioned readout layer uniformly in one direction before recording or reading information.

Preferably, the above-mentioned readout beam is irradiated from the side closer to the above-mentioned readout layer.

Preferably, the intensity of the above-mentioned readout beam is set so as to be more than 0.8 times the low intensity of the recording beam mentioned above.

The wavelength of the above-mentioned readout beam is preferably set so as to be shorter than the wavelength of the above-mentioned recording beam.

The above-mentioned readout beam is preferably irradiated to the above-mentioned magneto-optical recording medium through an lens different from the lens for the above-mentioned recording beam.

(7) In another magneto-optical recording medium for overwriting information by applying a phenomenon that different pieces of magnetization information are recorded on the magneto-optical recording medium when two kinds of recording beams of different degrees of intensity are irradiated to the magneto-optical recording medium, comprising:
an information storage layer and a readout layer together laminated on a substrate, the above-mentioned information storage layer and the abovementioned readout layer being mutually coupled magnetically at room temperature;
a magneto-optical recording medium, including the information storage layer and the readout layer and having characteristics of $T_{C1} < T_{C2}$, $H_{C1} > H_{C2}$ when Curie temperatures of the information storage layer and the readout layer are denoted respectively by $T_{C1}$ and $T_{C2}$ and their coercive forces at room temperature are denoted by $H_{C1}$ and $H_{C2}$, wherein a readout beam is irradiated to the abovementioned readout layer while applying a bias field different in at least either one of the direction and the intensity in reproduction from the bias field in recording, and the magnetization information is read out while copying the magnetization information recorded in the above-mentioned information storage layer to the above-mentioned readout layer.

This medium is preferably formed such that the readout beam is irradiated from the side closer to the readout layer.

Preferably, a thermally diffusive layer with a higher thermal conductivity than those of the above-mentioned information storage layer and readout layer is provided so as to be contiguous to either one of the above-mentioned information storage layer and readout layer and on the side opposite the side from which the beam is irradiated. Under this arrangement, the heat generated in the information storage layer and the readout layer by the irradiation with the recording beam or the readout beam diffuses to the side of the thermally diffusive layer with a higher thermal conductivity, so that the temperature of the magneto-optical recording medium is prevented from rising excessively, and there is no need to worry about the deterioration of the characteristics of the magneto-optical recording medium on which information is overwritten a number of times. Moreover, the response of the magneto-optical recording medium to heat becomes quick, and therefore, the shape of the recorded domains is stabilized, thus enhancing the signal quality.

(8) As materials which can be used as the above-mentioned information storage layer and readout layer, the following chemical compositions can be used: TbFeCo or TbFeCo added with T, Ni, Cr, Nb, Gd, B, or C for the information storage layer; TbDyFeCo, GdDyFeCo or GdTbFeCo or any one of them added with Ti, Ni, Cr, Nb, Gd, B, or C for the readout layer.

As the thermally diffusive layer, the usable material is an element such as Al, Au, Ag, Cu, Ti, Ni, Cr, Mn, or W, or an alloy made of one kind selected from among Al, Au, Ag and Cu and one kind selected from among Ti, Ni, Cr, Mn, or W.

(9) Another magneto-optical recording and reproducing method according to the present invention for copying the information recorded in the information storage layer to the readout layer by irradiating the readout beam to the readout layer in reproduction, further comprising the step of setting the direction of the magnetization of the readout layer uniformly in one direction in areas other than the copy area.

The copy area is preferably located in the center of the spot of the readout beam, by which the signal quality is improved.

In the magneto-optical recording method and the magneto-optical recording medium and device according to the present invention, since the readout layer and the information storage layer are magnetically coupled in reproduction, the readout layer which exhibits a great magneto-optical effect reflects the state of magnetization of the information storage layer. Therefore, by utilizing the great magneto-optical effect of the readout layer, a readout signal of high level can be obtained.

In recording, the readout layer and the information storage layer are magnetically decoupled, so that the readout layer does not affect the recording operation. For this reason, the recording characteristics can be obtained which are equivalent to those in a case where no readout layer is provided. Therefore, information can be reproduced with a higher S/N ratio than in the prior art while maintaining the recording characteristics similar to those in the prior art.

In another magneto-optical recording and reproducing device according to the present invention, in the readout process, the readout beam is irradiated to the above-mentioned readout layer while applying a bias field different in at least either one of the direction and the intensity from the bias field applied in recording. While the magnetization information recorded in the above-mentioned information storage layer is copied to the above-mentioned readout layer, the magnetization information is reproduced. Consequently, only information copied to the above-mentioned readout layer is read out.

In this case, the spot of the beam irradiated to the above-mentioned recording medium moves relative to the above-mentioned recording medium. Therefore, the area where information is copied by the irradiation with the readout beam is displaced a little from the readout beam spot when the information is copied, to be more specific, the copy area is located to the rear of the readout beam spot in the direction of the relative motion. Consequently, out of the information copied to the above-mentioned readout layer, only information present in the area within the readout beam spot is read out with the readout beam.

As described, the effective area of the beam spot that can be used for reproducing information is smaller than the whole readout beam spot, so that information can be reproduced with higher resolution than in the prior art. As a result, even if information is recorded and reproduced with high density, a high S/N ratio can be obtained.

The overwritable magneto-optical recording medium according to the present invention comprises an information storage layer and a readout layer that satisfy the conditions required for the magneto-optical recording and reproducing method and device in the present invention, and therefore, this magneto-optical recording medium can be used suitably for the magneto-optical recording and reproducing method and device.

DESCRIPTION OF THE PREFERRED EMBODIMENTS

Embodiments of the present invention will be described with reference to FIGS. 1 to 30.

[Magneto-optical recording medium]

(Composition of the first embodiment)

Figure 1:
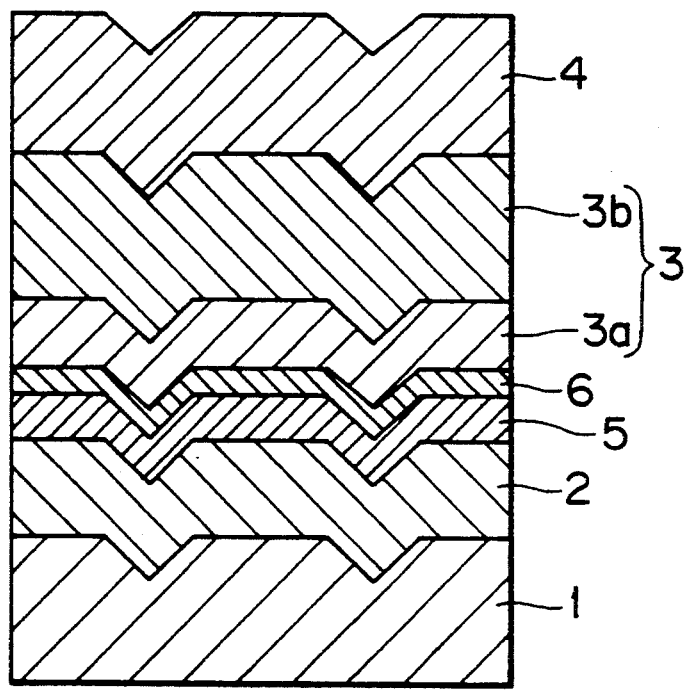
FIG. 1 is a sectional view of the principal portion of a first embodiment of the magneto-optical recording medium according to of the present invention.

FIG. 1 is a principal-portion Sectional view showing the composition of a first embodiment of the magneto-optical recording medium of the present invention.

This magneto-optical recording medium is formed by laminating a dielectric layer 2 (70 nm thick) of $SiN_x$, a readout layer 5 (30 nm thick) formed by a rare-earth dominant amorphous alloy of $Gd_{18}Tb_4Fe_{60}Co_{18}$, and a read control layer (5 nm thick) formed by an amorphous alloy film of $Dy_{25}Fe_{75}$ onto a transparent substrate 1 (5.25 inch in diameter) made of glass or the like having grooves for tracking formed in the surface thereof. An information storage layer 3, including a memory layer 3a (20 nm thick) formed by a rare-earth dominant amorphous alloy film of $Tb_{21}Fe_{61}Co_{18}$ and a writing layer 3b (70 nm thick) formed by a rare-earth dominant amorphous alloy film of $Tb_{16}Dy_{16}Fe_{60}Co_8$, is laminated to the read control layer 6. The thus laminated readout layer 5, the read control layer 6, the memory layer 3a and the writing layer 3b thus laminated are mutually exchange-coupled magnetically. A protective layer 4 (100 nm thick) formed by $SiN_x$ is formed on the writing layer 3b.

(Manufacturing method in the first embodiment)

The magneto-optical recording medium composed as described is manufactured as follows.

A transparent substrate 1 is mounted in an RF magnetron sputter equipment, the sputter equipment is evacuated below 0.1 mPa, then, a mixed gas of Ar and $N_2$ is introduced, and an $SiN_x$ layer (70 nm thick) is formed as the dielectric layer 2 by performing reactive sputtering using an Si target under a gas pressure of 1.3 Pa.

Subsequently, sputtering is carried out under an Ar gas pressure of 0.7 Pa using a target of a GdTbFeCo alloy to form a transition-metal dominant amorphous alloy film $Gd_{18}Tb_4Fe_{60}Co_{18}$ (30 nm thick) as the readout layer 5 on the dielectric layer 2.

Next, using a target of a DyFe alloy, sputtering is performed under an Ar gas pressure of 0.7 Pa to form an amorphous alloy film (5 nm thick) of $Dy_{25}Fe_{75}$ as the read control layer 6 on the readout layer 5.

Further, using a target of a TbFeCo alloy, sputtering is performed similarly under an Ar gas pressure of 0.7 Pa to form a transition-metal dominant amorphous alloy film (20 nm thick) of $Tb_{21}Fe_{61}Co_{18}$ as the memory layer 3a on the read control layer 6.

Additionally, using a target of a TbDyFeCo alloy, sputtering is performed similarly under an Ar gas pressure of 0.7 Pa to form a rare-earth dominant amorphous alloy film (70 nm thick) of $Tb_{16}Dy_{16}Fe_{60}Co_8$ as the writing layer 3b on the memory layer 3a.

Finally, after the chamber is again evacuated below 0.1 mPa, a mixed gas of Ar gas and $N_2$ gas is introduced, and reactive sputtering is performed using a target of Si under a gas pressure of 1.3 Pa to form an $SiN_x$ (100 nm thick) as a protective layer 4.

(Test results of the first embodiment)

Figure 2:
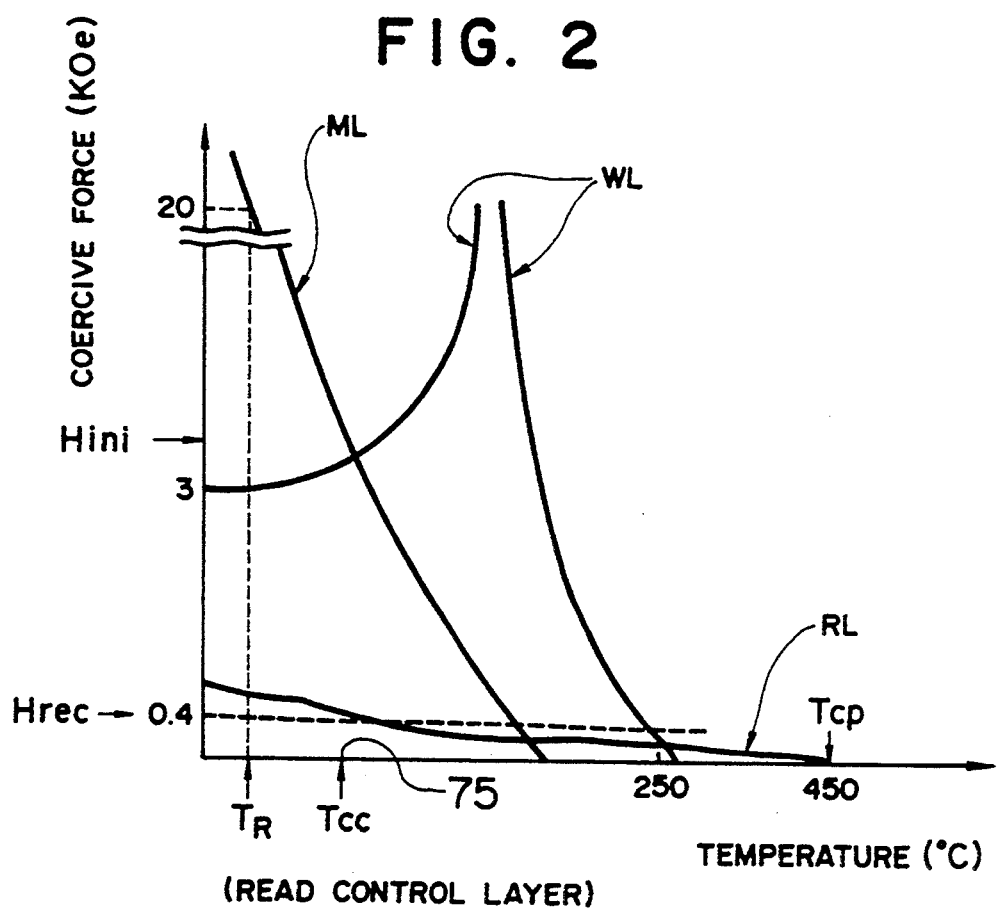
FIG. 2 is a graph showing the temperature dependency of the coercive force of the magneto-optical recording medium of the first embodiment.

Measurements were made of the temperature characteristics of the magnetic property of the memory layer 3a and the writing layer 3b of the magneto-optical recording medium constructed as described, and the characteristics shown in FIG. 2 were obtained. As is clear from FIG. 2, at room temperature the coercive force of the writing layer 3b was 3 kOe, and the coercive force of the memory layer 3a was 20 kOe. The Curie temperature Tcp of the readout layer 5 was 450° C. and the Curie temperature Tcc of the read control layer 6 was 75° C.

An overwriting test was conducted with a recording field of 0.4 kOe and a recording laser power (recording power) of 10 mW, and the writing temperature was found to be about 250° C. and the erasing temperature to be about 125° C. Therefore, in writing and erasing, the magnetization of the read control layer 6 disappears and the magnetization of the readout layer 5 remains. For this reason, the readout layer 5 and the memory layer 3a having information stored therein are decoupled magnetically, so that the readout layer 5 is prevented from affecting the overwriting operation.

On the other hand, by setting the readout temperature of the recording medium so as to be lower than the Curie temperature Tcc (75° C.) of the read control layer 6 by adjusting the readout laser power (readout power), the readout layer 5 and the memory layer 3a are coupled magnetically in reproducing information. Therefore, by applying a great magneto-optical effect of the readout layer 5, a readout signal of high level can be obtained.

Then, in an overwriting operation performed on the above-mentioned magneto-optical recording medium, the recording and reading characteristics were examined. The initializing field Hini of 5 kOe was applied with an Sm—Co system permanent magnet. The recorded mark length was 5 μm, and the readout power was 1.2 mW.

Figure 3:
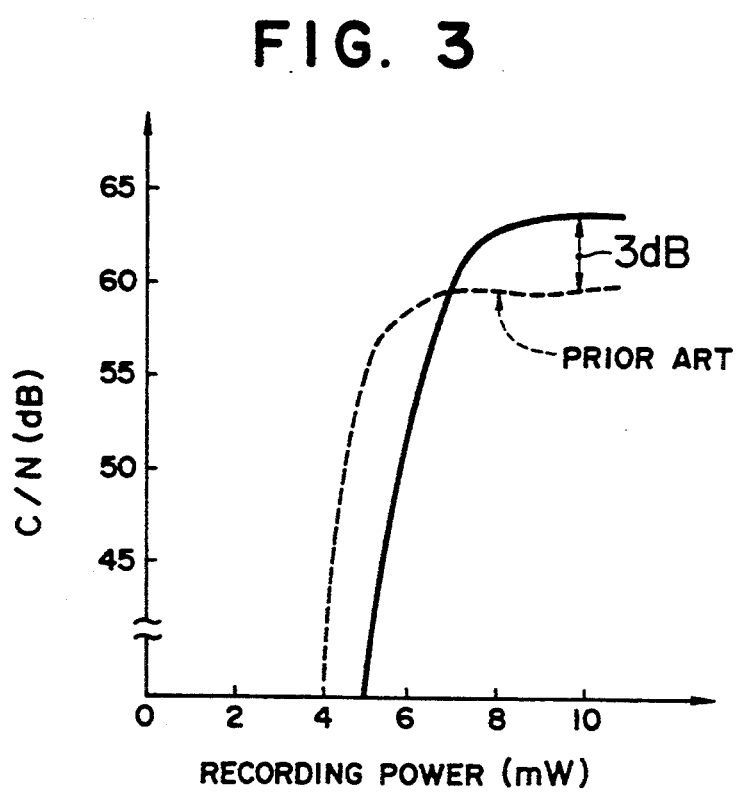
FIG. 3 is a graph showing the recording power dependency of C/N of the magneto-optical recording medium of the first embodiment.

FIG. 3 shows the write/read characteristics of this magneto-optical recording medium in an overwriting operation, and also shows the characteristics of the prior-art magneto-optical recording medium. The prior-art magneto-optical recording medium used here is of the same composition as the magneto-optical recording medium according to the first embodiment, if the readout layer 5 and the read control layer 6 were taken away from the first embodiment.

As shown in FIG. 3, in the magneto-optical recording medium of the present invention, a C/N of 62dB could be obtained at the recording power of 10 mW. In contrast, the prior-art magneto-optical recording medium obtains a C/N of no more than 59dB. Therefore, the magneto-optical recording medium of the present invention can obtain a C/N 3dB higher than in the prior art. This means that the Kerr rotation angle has, in terms of effectiveness, improved to about 1.4 times that of the prior art.

As is obvious from FIG. 3, the overwriting characteristics are substantially the same as those of the prior art, only difference being the sensitivity somewhat lower than in the prior art (in other words, a greater recording power is required) owing to the presence of the readout layer 5 and the read control layer 6.

Figure 4:
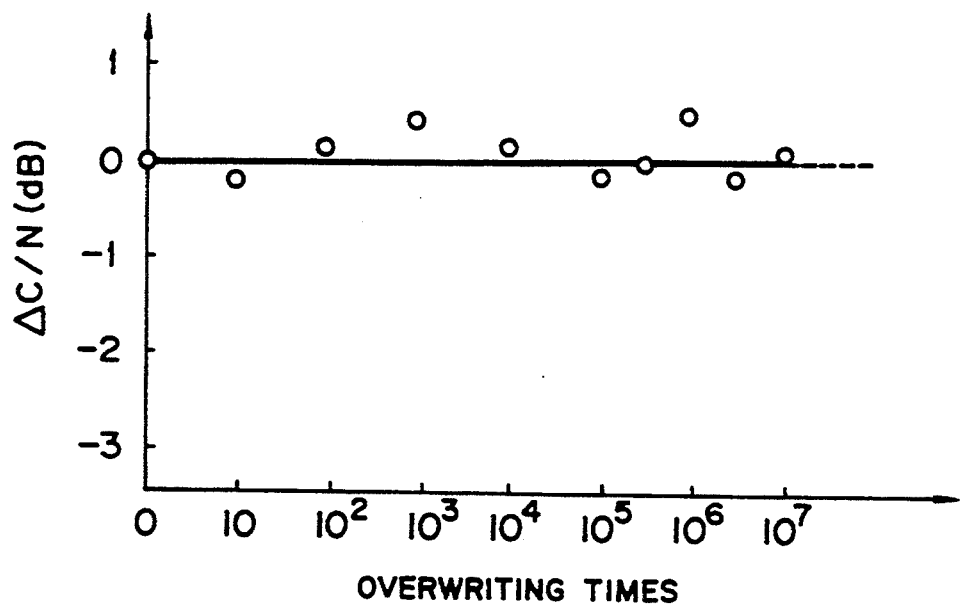
FIG. 4 is a graph showing changes of C/N in relation to the number of times of overwriting on the magneto-optical recording medium of the first embodiment.

Also, using this magneto-optical recording medium of the first embodiment, an overwriting repetition test was conducted, the results of which are shown in FIG. 4. As indicated in FIG. 4, after overwrite operations of $10^7$ times, the C/N shows substantially no change. This is also the same as in the prior art.

Figure 5:
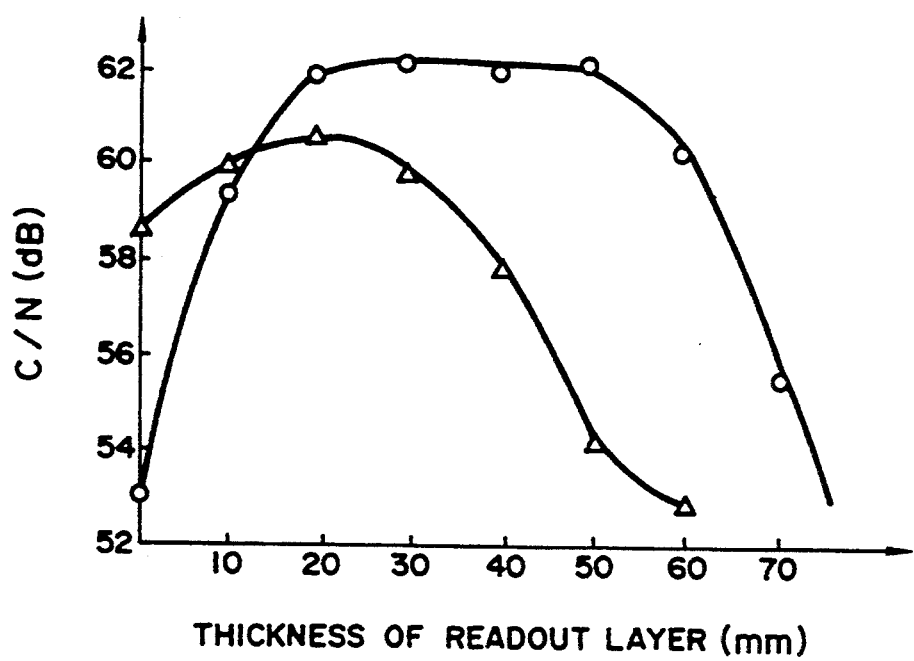
FIG. 5 is a graph showing the readout layer thickness dependency of C/N of the magneto-optical recording medium of the first embodiment.

Also on this magneto-optical recording medium of the first embodiment, changes in the C/N were examined by varying the thickness of the readout layer 5, the results of which are shown in FIG. 5. When the film thickness of the readout layer 5 is less than 15 nm, the effects of the addition of the readout layer 5 are small and a sufficiently large Kerr rotation angle cannot be obtained, so that the C/N does not become large. When the thickness of the readout layer 5 is more than 60 nm, the C/N drops, and under the optical microscope, it was found that this drop is attributable to the disorder of the domains of the memory layer 3a caused by the readout layer 5. Therefore, the thickness of the readout layer 5 is preferably in the range of 15 nm to 60 nm, and more preferably in the range of 20 nm to 50 nm.

FIG. 5 also shows the changes in the C/N of the magneto-optical recording medium manufactured with the same composition as the first embodiment if the read control layer 6 were taken away from the first embodiment. A comparison of the two recording medium clarifies that if the read control layer 6 is not provided, the disorder of the shape of the domains of the memory layer 3a appears more conspicuously by the addition of the readout layer 5, so that the addition of the readout layer 5 hardly contributes to the improvement of the C/N.

(Composition of the second embodiment)

Figure 6:
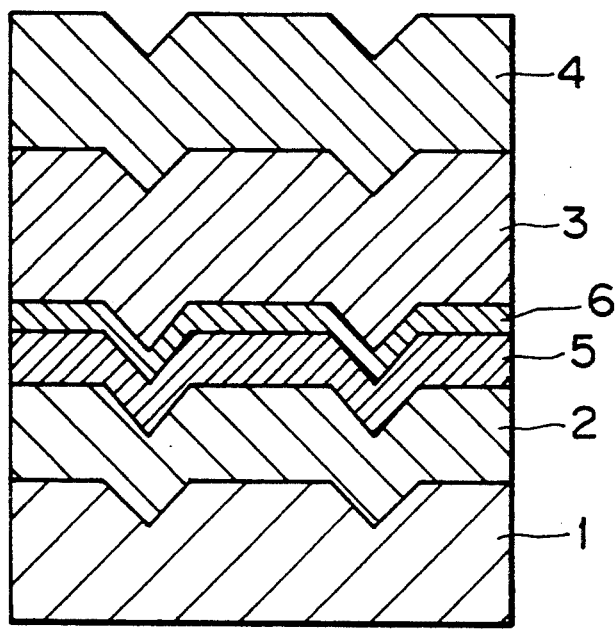
FIG. 6 is a sectional view of the principal portion of a second embodiment of the magneto-optical recording medium according to the present invention.

FIG. 6 is a principal-portion sectional view showing the composition of a second embodiment of the magneto-optical recording medium according to the present invention. This second embodiment differs from the above-mentioned first embodiment in that the information storage layer 3 comprises a single layer.

In the magneto-optical recording medium of the second embodiment, a dielectric layer 2 (70 nm thick) of $SiN_x$, a readout layer 5 (5 nm thick) formed by a transition-metal dominant amorphous alloy film of $Gd_{18}Tb_4Fe_{60}Co_{18}$, and a read control layer 6 (5 nm thick) formed by an amorphous alloy film of $Dy_{25}Fe_{75}$ are formed on a transparent substrate 1 (5.25 inch in diameter) made of glass or the like having grooves for tracking formed in the surface thereof. This composition is the same as in the first embodiment described earlier.

An information storage layer 3 comprising a rare-earth dominant amorphous alloy film (80 nm thick) of $Tb_{24}Fe_{68}Co_8$ is formed on the read control layer 6. The readout layer 5, the read control layer 6, and the information storage layer 3 laminated together are magnetically exchange-coupled.

Like in the first embodiment mentioned above, finally, a protective layer 5 (100 nm thick) comprising $SiN_x$ is formed on the information storage layer 3.

(Manufacturing method of the second embodiment)

The magneto-optical recording medium of the second embodiment composed as described is manufactured as follows.

A transparent substrate 1 is mounted in the RF magnetron sputter chamber., and in the same manner as in the first embodiment, an $SiN_x$ (70 nm thick) to serve as the dielectric layer 2, a transition-metal dominant amorphous alloy film (30 nm thick) of $Gd_{18}Tb_4Fe_{60}Co_{18}$ as the readout layer 5, and an amorphous alloy film (5 nm thick) of $Dy_{25}Fe_{75}$ are laminated one after another onto the substrate 1.

Then, sputtering is performed under an Ar gas pressure of 0.7 Pa using a target of a TbFeCo alloy to form a rare-earth dominant amorphous alloy film (80 nm thick) of $Tb_{24}Fe_{68}Co_8$ as the information storage layer 3 on the read control layer 6.

In the final stage, like in the first embodiment, an $SiN_x$ (100 nm thick) as the protective layer is formed.

(Test results of the second embodiment)

On the magneto-optical recording medium of the second embodiment, measurements were made of the temperature characteristics of the coercive forces of the respective layers. The results show that in the information storage layer 3, the compensation temperature is 80° C., and the Curie temperature is 220° C. In the readout layer 5 and the read control layer 6, both having the same compositions as in the first embodiment, their Curie temperatures are 450° C. and 75° C., the same as in the first first embodiment.

As in the first embodiment, recording and erasing tests were conducted with the recording field of 0.4 kOe and the recording power of 10 mW to examine the recording and erasing temperatures, which as test results were found to be about 180° C., respectively. Therefore, in recording and erasing, the magnetization of the read control layer 6 disappears, and the magnetization of the readout layer remains. For this reason, the readout layer 5 and the information storage layer 3 are decoupled magnetically, so that the readout layer 5 has no influence over the recording and erasing operations.

On the other hand, by setting the readout temperature so as to be lower than the Curie temperature Tcc (75° C.) of the read control layer 6 by adjusting the readout power, the readout layer 5 and the information storage layer 3 are coupled magnetically in reproduction. Therefore, by using a great magneto-optical effect of the readout layer 5, a readout signal of high level can be obtained.

Next, the write/read characteristics were examined on the magneto-optical recording medium of the second embodiment mentioned above. The recorded mark length was 5 μm, and the readout power was 1 mW. This magneto-optical recording medium is incapable of over-writing, so that at the time of erasing, with the direction of the recording field reversed, the laser beam of 10 mW power was irradiated to the medium continuously.

Figure 7:
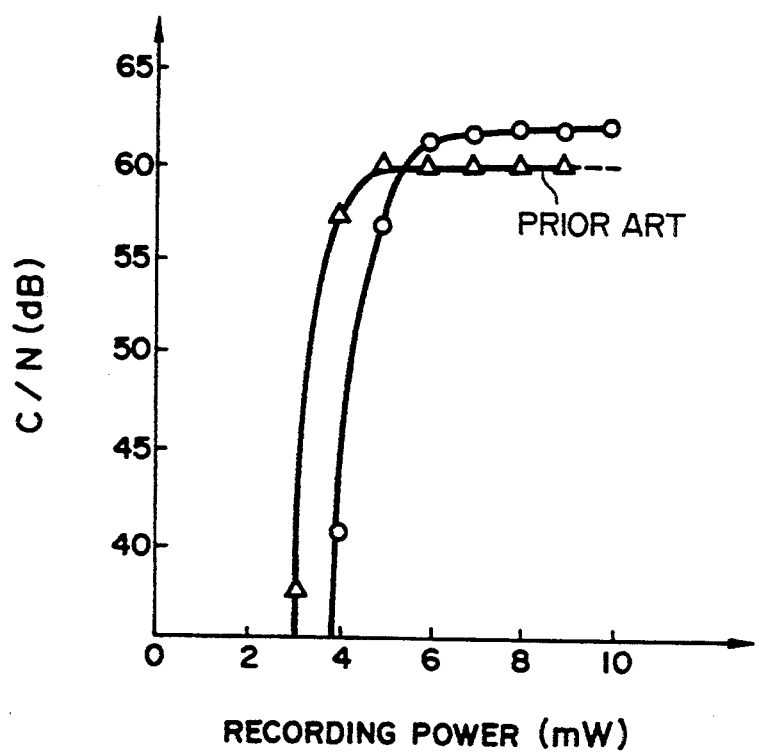
FIG. 7 is a graph showing the recording power dependency of C/N of the magneto-optical recording medium of the second embodiment.
Figure 8:
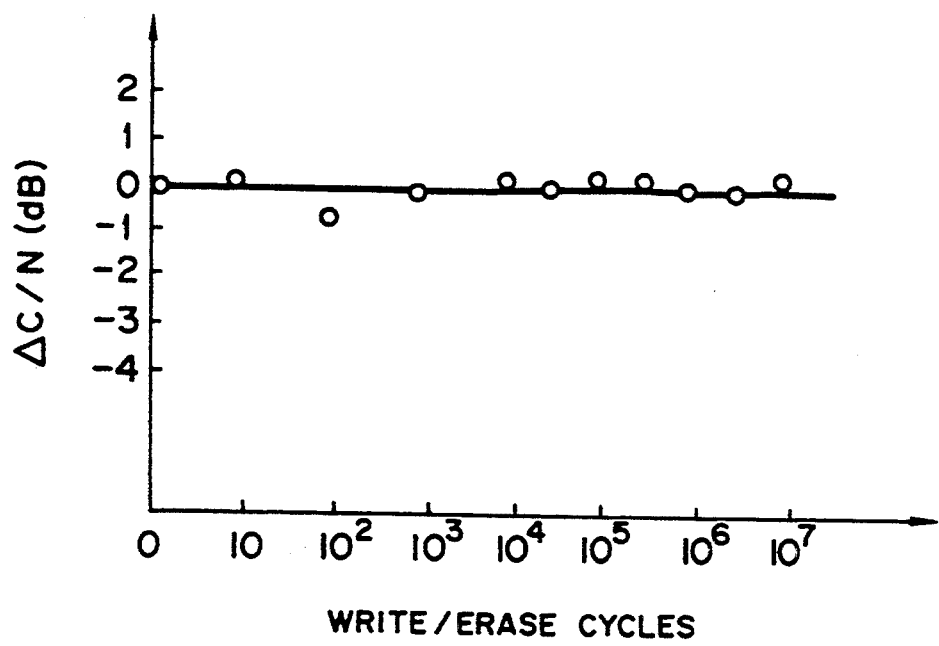
FIG. 8 is a graph showing changes of C/N relative to the number of times of recording and erasing on the magneto-optical recording medium of the second embodiment.

FIG. 7 shows the write/read characteristics of the recording medium of the second embodiment and the characteristics of the prior art recording medium, as well. The magneto-optical recording medium of the second embodiment used here is of the same composition as the recording medium of the second embodiment if the readout layer 5 and the read control layer 5 were taken away from the second embodiment.

As shown in FIG. 7, with this magneto-optical recording medium of the present invention, a C/N of 62 dB can be obtained when the recording power is 10 mW. In contrast, the prior-art magneto-optical recording medium obtains no more than 60 dB. Therefore, it is understood that the magneto-optical recording medium of the present invention secures the C/N 2 dB higher than in the prior art. This means that the Kerr rotation angle has, in terms of effectiveness, improved to about 1.2 times that of the prior art.

As is obvious from FIG. 7, the recording and erasing characteristics are substantially the same as those of the prior art, only difference being the sensitivity somewhat lower than in the prior art (in other words, a greater recording power is required) owing to the presence of the readout layer 5 and the read control layer 6.

Also, using this magneto-optical recording medium of the first embodiment, an overwriting repetition test was conducted, the results of which are shown in FIG. 4. As indicated in FIG. 4, after overwrite operations of $10^7$ times, the C/N shows substantially no change. This is also the same as in the prior art.

(Third embodiment)

Figure 9:
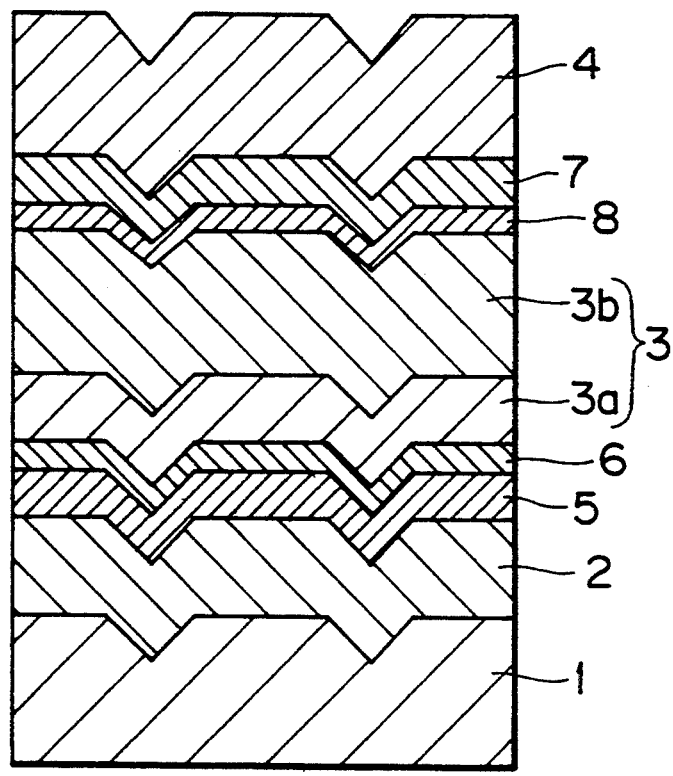
FIG. 9 is a sectional view of the principal portion of a third embodiment of the magneto-optical recording medium according to the present invention.

FIG. 9 is a principal-portion sectional view showing the composition of a third embodiment of the magneto-optical recording medium according to the present invention. The third embodiment is formed by providing an initializing layer 7 and a initialization control layer 8 between the writing layer 3b and the protective layer 4 in the above-mentioned first embodiment. In this third embodiment, the initializing layer 7 applies the initializing field to the writing layer 3b, which arrangement offers an advantage of obviating the need to install an initializing magnet outside.

In the magneto-optical recording medium of the third embodiment, the initialization control layer 8 formed on the writing layer 3b performs a function similar to that of the read control layer 6. More specifically, at the recording and erasing temperatures, the magnetization of the initialization control layer 8 disappears, thus causing the writing layer 3b and the initializing layer 7 to be magnetically decoupled. At the readout temperature, the magnetization of the initialization control layer 8 remains, leaving the writing layer 3b and the initializing layer 7 magnetically coupled, so that the magnetization of the writing layer 3b is oriented to the same direction of the initializing layer 7, that is to say, the writing layer 3b is initialized. Hence, the initialization control layer 8 can be formed by the same magnetic layer as the read control layer 6, for example, by using the same amorphous alloy film (5 nm thick) of $Dy_{25}Fe_{75}$ as was used for the read control layer 6 in the first embodiment.

The initializing layer 7 formed on the initialization control layer 8, which applies a magnetic field for initializing the writing layer 3b, can be formed arbitrarily by a magnetic layer which has a large coercive force at room temperature TR and a high Curie temperature, and which does not allow the magnetized direction to be reversed during recording and erasing operations. To give an example, the initializing layer 7 can be formed by an amorphous alloy film of TbFe.

The manufacturing method of the third embodiment is substantially the same as that of the first embodiment mentioned above. After the writing layer 3b is formed, it is only necessary to laminate the initialization control layer 8, the initializing layer 7, and a protective layer 4 in this order onto the writing layer 3b. The initialization control layer 8 has only to be formed by exactly the same method as in forming the read control layer 6, and also, the initializing layer 7 may be formed by the same method.

[Magneto-optical recording method]

Information was recorded on a magneto-optical recording medium of the first embodiment with a recorded mark length of 0.4 μm by changing the recording power. This information was reproduced by setting the readout power in a range of 1.0 to 4.0 mW, and the C/N was measured. The results are shown in FIG. 10.

Figure 10:
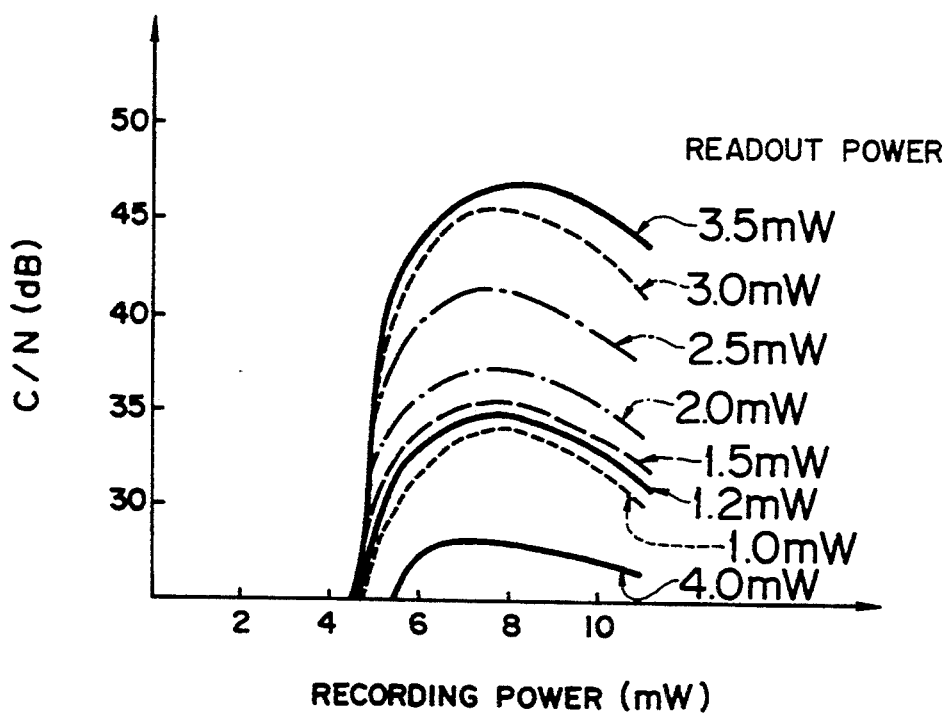
FIG. 10 is a graph showing changes of the recording power dependency of C/N relative to the readout power in the magneto-optical recording medium of the first embodiment.

As is clear from FIG. 10, when information was reproduced with the same readout power of 1.2 mW as in the test on the first embodiment, The maximum value of the C/N was about 35 dB, a much lower value than the value (62 dB) obtained in the above-mentioned test on the first embodiment. The reason for this is that since the recorded mark length is shorter than the spot diameter of the readout laser beam, the adjacent recorded marks cannot be resolved sufficiently.

However, as can be seen from FIG. 10, when the readout power is increased from 1.2 mW, the C/N rises sharply from around 2.5 mW, and reaches its maximum at 3.5 mW. Note that when the readout power is increased to 4.0 mW, conversely, the C/N decreases. In this case, it follows therefore that when the readout power is set in a range of about 2.5 to 3.5 mW, information can be reproduced by sufficiently resolving the recorded domains of a recorded mark length of 0.4 μm. This phenomenon is attributable to the following reason.

When the laser beam is irradiated with the readout power of the above range to the magneto-optical recording medium of the first embodiment, in the area ahead of the laser beam spot, the magnetization of the readout layer 5 remains oriented in the same direction as the magnetization of the memory layer 3a. However, at the rear of the laser beam spot, the coercive force of the readout layer 5 decreases with the rising temperature of the readout layer 5 caused by heating, and the magnetized direction of the readout layer 5 is turned by the recording field Hrec to the direction of the recording field Hrec. In other words, at the rear of the laser beam spot, the magnetization of the readout layer 5 is set in the same direction regardless of the presence or absence of the recorded marks. Therefore, the result is equivalent to that of a case in which no beam is irradiated to the rear of the readout beam spot, or in other words, the result is as if a small laser beam spot were irradiated which would be made up of only the front portion of the laser beam spot. It is considered that in consequence of an improvement in the resolution of the laser beam as described, small recorded marks as small as 0.4 μm can be reproduced with a high C/N.

The magnetization of the readout layer 5 oriented in the same direction of the recording field Hrec in reproduction will revert, owing to the subsequently falling temperature, to the original state by being subjected to the influence of the mutually exchange-coupled read control layer 6, memory layer 3a, and writing layer 3b.

The readout power at this time is set in such a range that the magnetized direction of the readout layer 5 is changed by the recording field Hrec, but the magnetized direction of the memory layer 3a remains unchanged. Also, the readout power has only to be in such a range that the magnetization of the readout layer 5 can be oriented in one direction, and need not be in such a magnitude as to raise the temperature of the readout layer 5 to near its Curie temperature.

Figure 11:
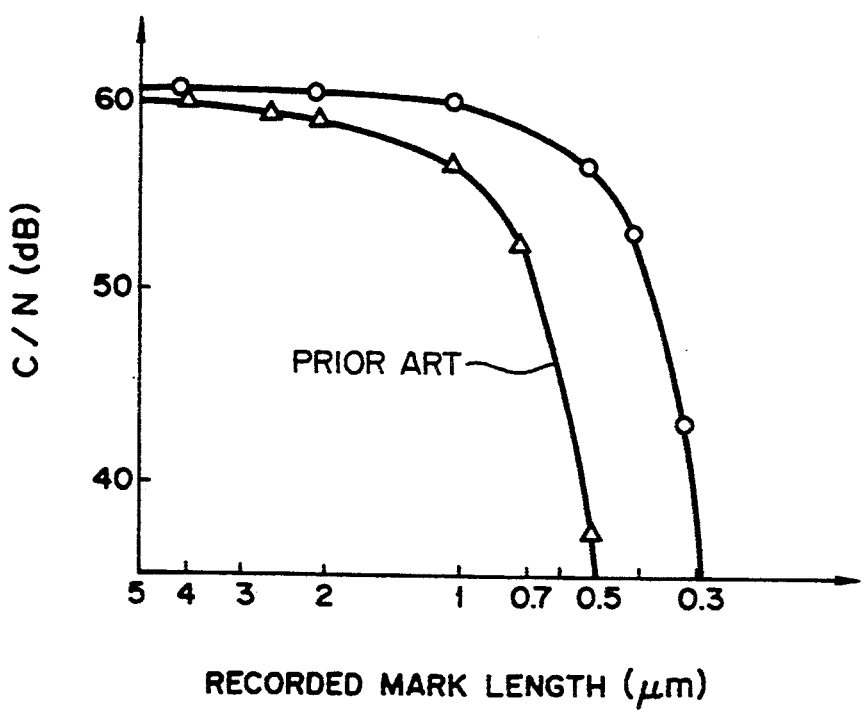
FIG. 11 is a graph showing the recorded mark length dependency of C/N in the magneto-optical recording medium of the first embodiment.

FIG. 11 shows changes in the C/N relative to the recorded mark length of the magneto-optical recording medium of the first embodiment. FIG. 11 also shows a similar curve for the prior-art recording medium used in the test on the first embodiment. The recording power was 8 mW, while the readout power was 3.5 mW.

From FIG. 11, it can be understood that in the magneto-optical recording medium according to the present invention, the resolution has improved about twice greater than that of the prior art.

The magneto-optical recording method described in this specification can be applied to the magneto-optical recording medium of the second embodiment mentioned above. In the magneto-optical recording medium of the second embodiment, the readout power is set in such a range that the magnetized direction of the readout layer 5 changes, but the magnetized direction of the information storage layer 3 does not change.

(Magneto-optical recording device)

Figure 12:
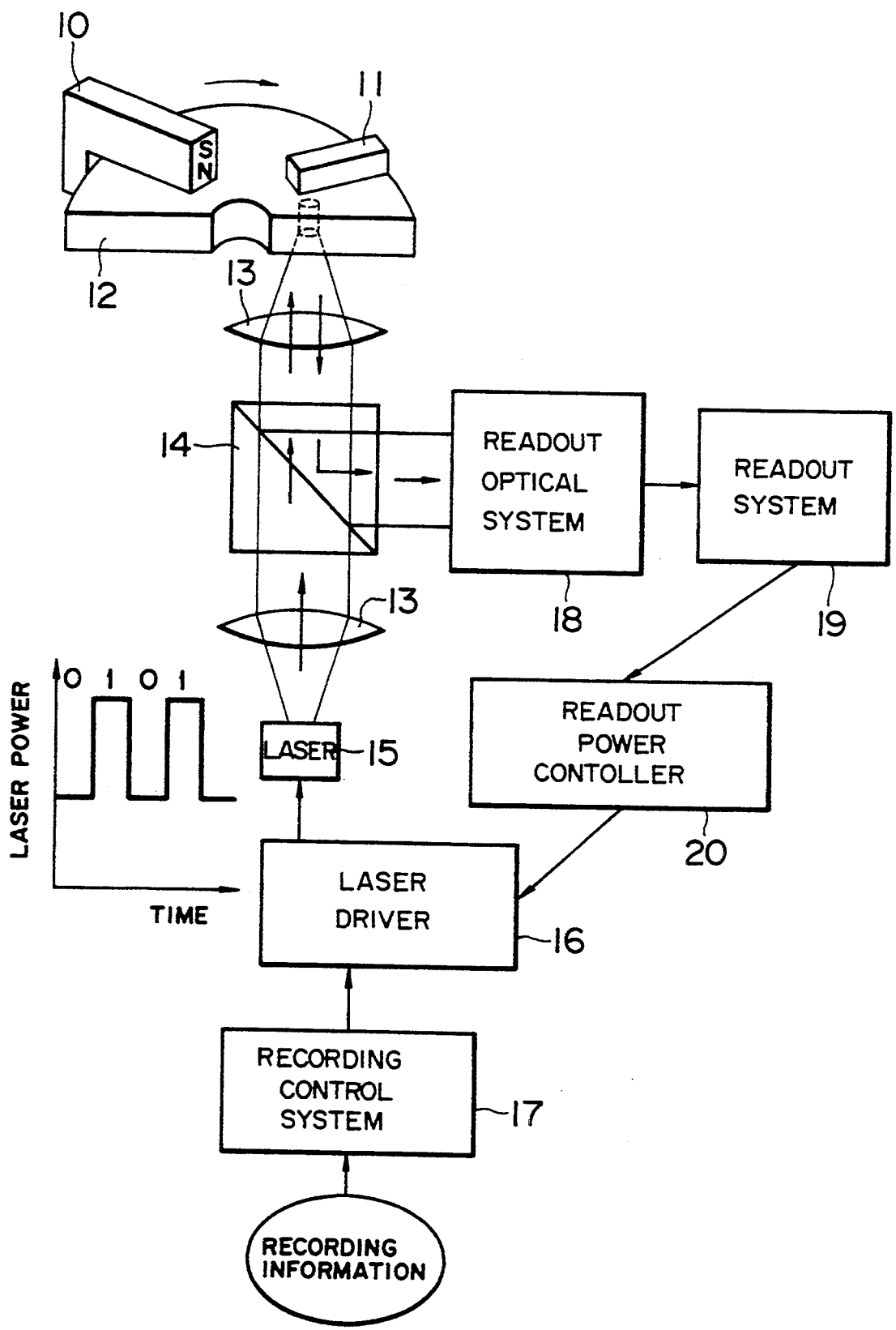
FIG. 12 a schematic block diagram showing an embodiment of the magneto-optical recording device according to the present invention.
Figure 13:
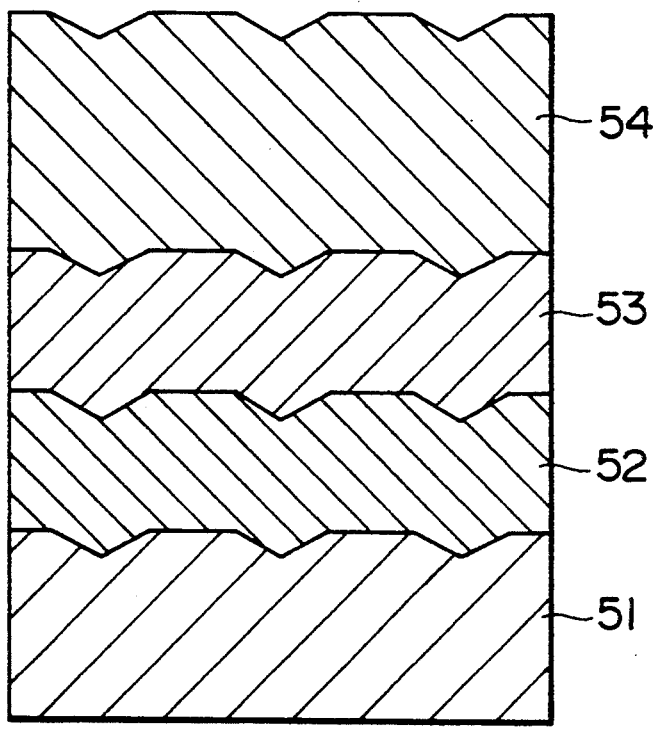
FIG. 13 is a principal-portion sectional view showing a general composition of the prior-art magneto-optical recording medium.
Figure 14:
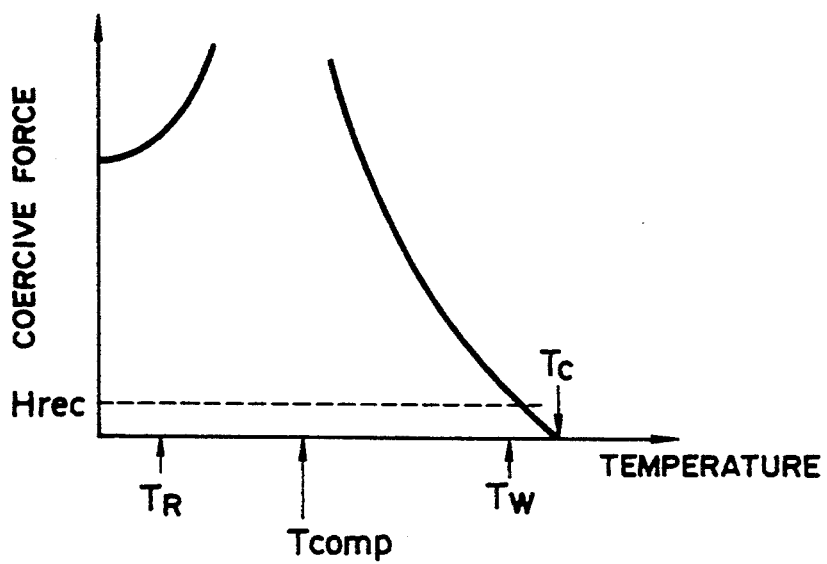
FIG. 14 is a graph showing the temperature dependency of the coercive force of the magneto-optical recording medium in FIG. 3.
Figure 15:
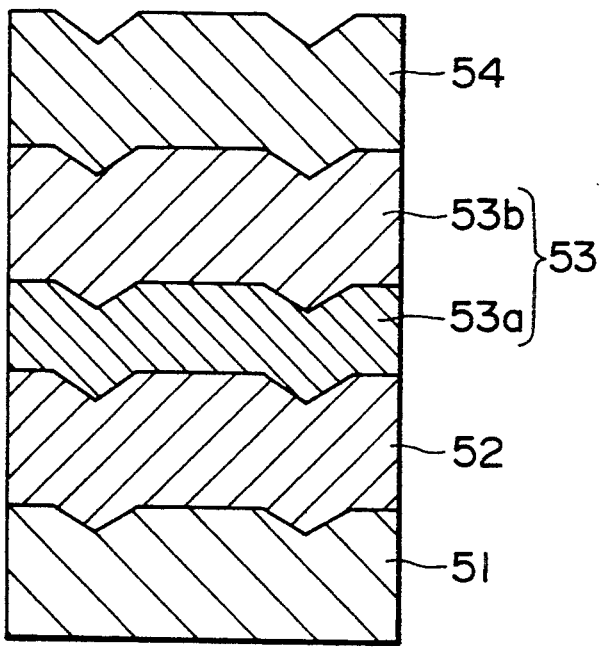
FIG. 15 is a principal-portion sectional view showing an example of the prior-art overwritable magneto-optical recording medium.
Figure 16:
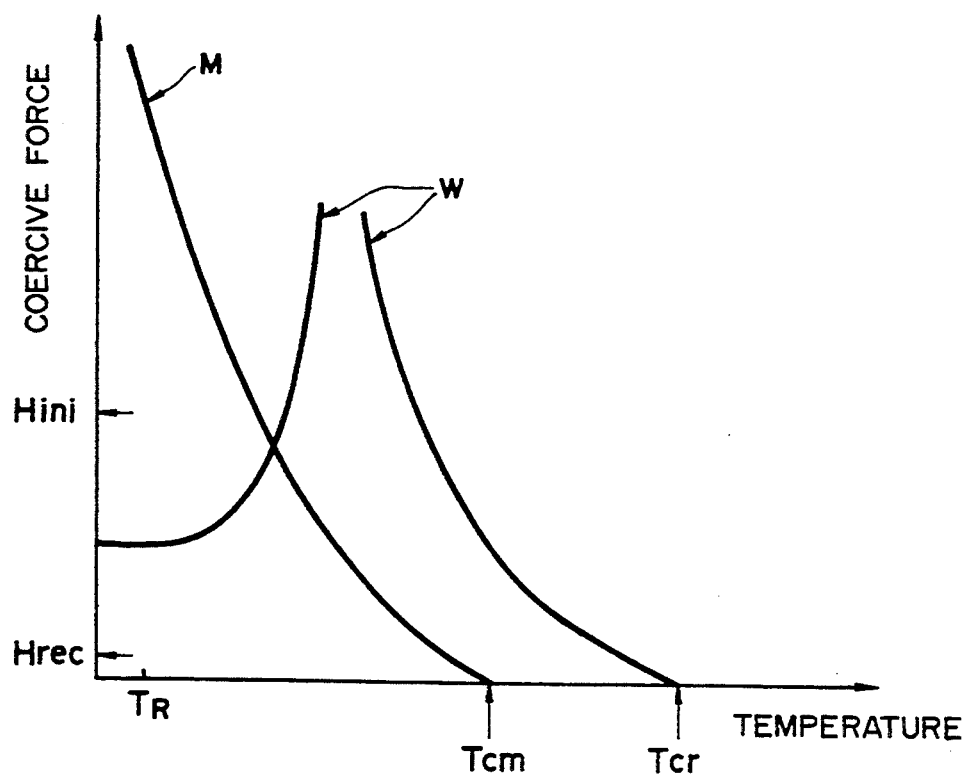
FIG. 16 is a graph showing the temperature dependency of the coercive force of he prior-art magneto-optical recording medium in FIG. 15.
Figure 17A:
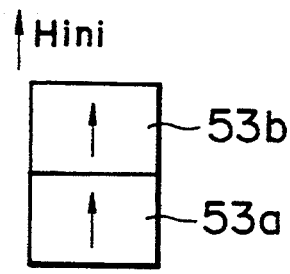
FIGS. 17A to 17G are diagrams for explaining the overwrite operation of the prior-art magneto-optical recording medium in FIG. 15.
Figure 17B:
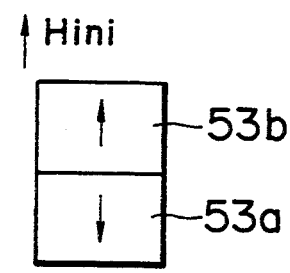
Figure 17C:
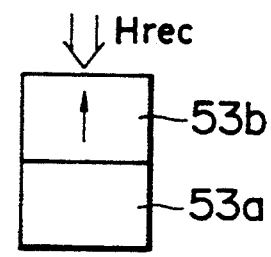
Figure 17D:
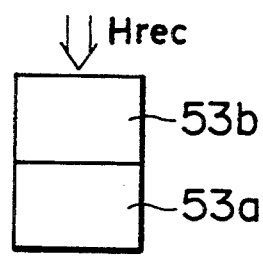
Figure 17E:
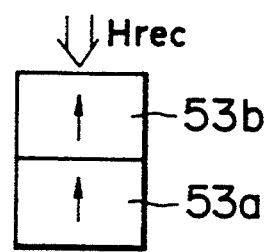
Figure 17F:
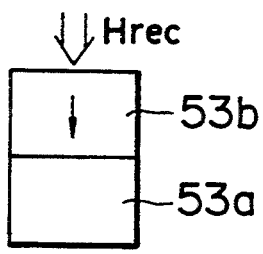
Figure 17G:
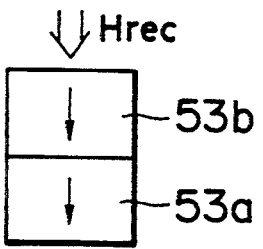

FIG. 12 is a block diagram showing an embodiment of the magneto-optical recording device according to the present invention.

This magneto-optical recording device comprises the above-mentioned magneto-optical recording medium 12 of the first embodiment. The magneto-optical recording medium 12 is driven to rotate by a driving device, not shown. In the vicinity of the magneto-optical recording medium 12, there are installed an initializing magnet 10 for applying the initializing field to orient the magnetization of the writing layer $3b$ in one direction before recording, and also a recording magnet 11 for applying the recording field.

A recording control system 17 controls a laser driver 16 to modulate the laser beam power between high and low levels according to the recording information. The modulated laser beam emitted from a laser 15 is introduced into a beam splitter 14 by a lens 13, and is focused by the lens on the magneto-optical recording medium 12, in which beam spot the recorded domains are formed.

The laser beam emitted from the laser 15 at the time of reproduction is focused on the magneto-optical recording medium 12 after passing through the lens 13, the beam splitter 14, and another lens 13. The reflected light is introduced into a readout optical system 18 through the lens 13 and the beam splitter 14, and after converted into an electric signal, is sent to a readout power controller 20.

The readout power controller 20 controls the laser driver 16 in reproduction to set the readout power at a level of power (about 3 mW, for example) which ensures reading with a high resolution. Preferably, the readout power is controlled so that the readout signal is maximum when information is recorded with the shortest recorded mark length.

This recording device is capable of overwriting with a single beam under the same arrangement mentioned when the prior art was described with reference to FIG. 15 to FIGS. 17A to 17G.

In this device, if a magneto-optical recording medium of the third embodiment is used as the magneto-optical recording medium 12, the initializing magnet can be done away with.

(Fourth embodiment)

Figure 19:
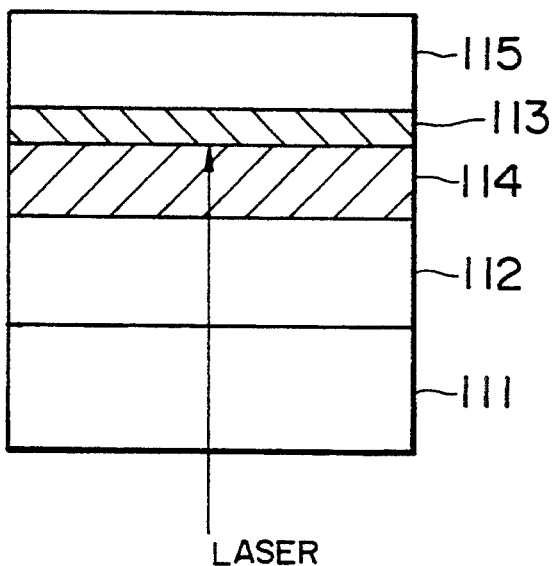
FIG. 19 is a sectional view of the magneto-optical recording medium of a fourth embodiment, used for the magneto-optical recording and reproducing method in FIG. 1.

FIG. 19 shows the magneto-optical recording medium according to a fourth embodiment of the present invention. This medium is formed by laminating an $SiN_x$ (70 nm thick) as a dielectric layer 112, an amorphous alloy film (100 nm thick) of $Tb_{10}Dy_{16}Fe_{66}Co_8$ as a readout layer 114, an amorphous alloy film (40 nm thick) of $Tb_{21}Fe_{78}Co_2$ as an information storage layer 113, and an $SiN_x$ (100 nm thick) as a protective layer 115 in this order onto a 5.25-inch transparent substrate 111 made of glass or plastic and having grooves for tracking formed therein. This medium is manufactured by the process described in the following.

The transparent substrate 1 is mounted in the RF magnetron sputter chamber, and after the chamber is evacuated below 0.1 mPa, a mixed gas of Ar and $N_2$ is introduced, and reactive sputtering is performed using an Si target under a gas pressure of 1.3 Pa to laminate an $SiN_x$ 70 nm thick as the dielectric layer 12 to the substrate 1.

Subsequently, sputtering is carrier out using a TbDyFeCo alloy under an Ar gas pressure of 0.7 Pa, by which a 100 nm amorphous alloy film of $Tb_{10}Dy_{16}Fe_{66}Co_8$ as the readout layer 114 is laminated to the $SiN_x$ film. Then, sputtering is performed under an Ar gas pressure of 0.7 Pa using a TbFeCo alloy as the target, by which an amorphous alloy film of $Tb_{21}Fe_{78}Co_2$ as the information storage layer 113 is laminated in a film thickness of 40 nm onto the amorphous alloy film of $Tb_{10}Dy_{16}Fe_{66}Co_8$. The readout layer 114 and the information storage layer 113 laminated as described are magnetically exchange-coupled.

Then, after the RF magnetron sputter chamber is again evacuated below 0.1 mPa, a mixed gas of Ar gas and $N_2$ gas is introduced, and reactive sputtering is performed under a gas pressure of 1.3 Pa using an Si target, by which an $SiN_x$ film as the protective layer 15 is laminated in a film thickness of 100 nm to the amorphous alloy film of $Tb_{21}Fe_{78}Co_2$. In this way, the medium of the composition shown in FIG. 19 was obtained.

In this embodiment, the information storage layer 113 is formed of a transition-metal dominant alloy, and its Curie temperature $T_{c1}$ is 160° C. The readout layer 114 is formed of a transition-metal dominant alloy, and its Curie temperature $T_{c2}$ is 250° C. Therefore, $T_{c1} < T_{2c}$. At room temperature, the coercive force $H_{c2}$ of the readout layer 114 is 3 kOe, and the coercive force $H_{c1}$ of the information storage layer 113 is 10 kOe (FIG. 20B), and therefore, $H_{c1} > H_{c2}$. The exchange field for the readout layer 114 and the information storage layer 113 is not so large.

The information storage layer 113 and the readout layer 114 used in this embodiment are respectively formed by a rare-earth/transition-metal amorphous alloy film, and therefore, the direction of the magnetization of each layer changes depending on which is greater between the magnetic moments of the rare-earth and the transition-metal alloys, coupled in opposite directions. So, the layer having a greater magnetic moment of the transition metal is described as "rare-earth dominant", while the layer having a greater magnetic moment of the transition metal is described as "transition-metal dominant". Generally, the rare-earth dominant layers often change to transition-metal dominant at high temperatures.

Figure 21:
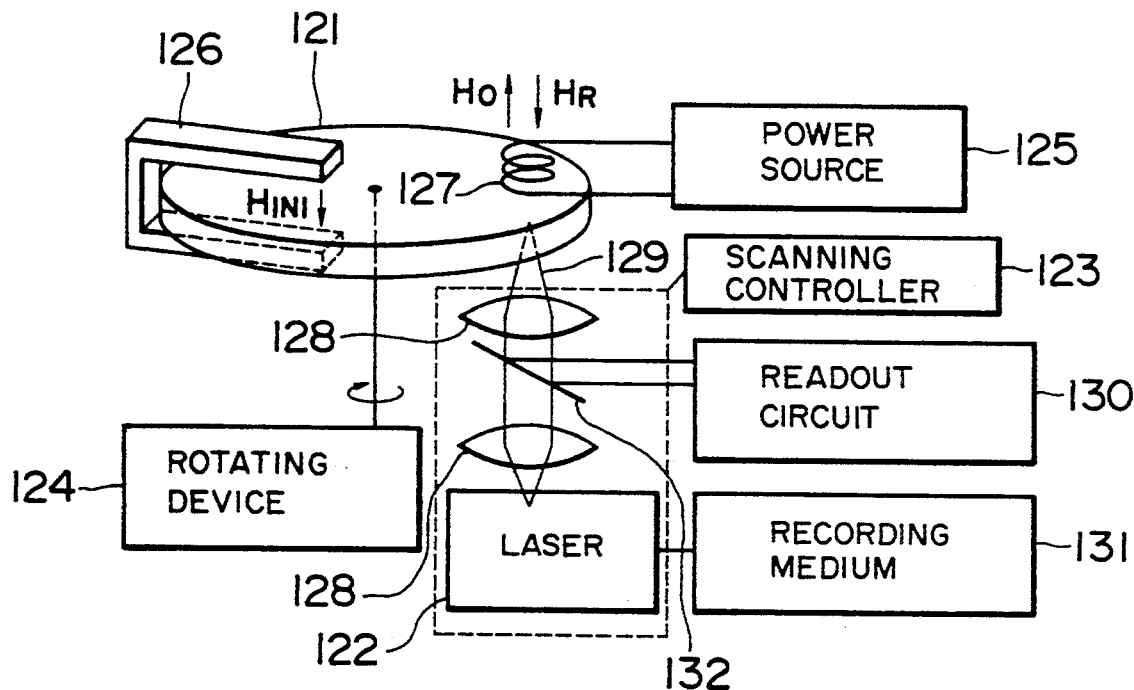
FIG. 21 is a diagram for explaining the principal portion of the magneto-optical recording and reproducing device used for the magneto-optical recording and reproducing method in FIG. 1.

FIG. 21 shows a magneto-optical recording and reproducing device including a magneto-optical recording medium composed as described. A magneto-optical recording medium 121 in a disc shape has a structure as mentioned above, and is driven to rotate by a rotating device 124. A laser beam 129 (wavelength 780 nm) emitted from a laser 122 is irradiated to a recording medium 121 through a lens 128, a beam splitter 132, and another lens 128. The laser beam 129 reflected by the recording medium 121 passes through the lens 128 and the beam splitter 132, and is injected into the readout circuit 130 where the information recorded in the recording medium 131 is reproduced. The laser 122 is driven by a laser driver 131. A scanning controller 123 scans the laser beam 129 on the recording medium 121. A bias power source 125 supplies an electromagnet 127 with a current to apply a recording bias field $H_o$ (400 Oe, upward) and a readout bias field $H_R$ (800 Oe, downward) to the recording medium 121. An initializing field applying means 126, which comprises a permanent magnet, applies a magnetic field $H_{INI}$ (4 kOe, downward) to the recording medium 121 to initialize it.

In this device, the recording bias field $H_o$ and the readout bias $H_R$ are directed in opposite directions, and they have different degrees of intensity.

The recording medium 121, as it rotates, first passes under the initializing field applying means 126, and has the initializing field $H_{INI}$ applied thereto. Then, information is recorded or reproduced when the laser beam 129 focused by the lens 128 is irradiated to the recording medium 121 under the electromagnet 127 which applies the bias field to the recording medium 121. The bias field $H_o$ is applied for recording, and the bias field $H_R$ is applied for reproduction. As the recording medium 121 continues to rotate, the initializing field $H_{INI}$ is again applied to the medium after recording and reproduction.

In this embodiment, the laser beam 129 is always irradiated through the substrate 111 to the readout layer 114 so that the reproducing laser beam 129 is injected from the side closer to the readout layer 114. Since the Curie temperature $T_{c2}$ of the readout layer 114 is higher than the Curie temperature $T_{c1}$ of the information storage layer 113, the Kerr rotation angle is greater. The resulting advantage is that a larger readout signal can be obtained than by the earlier-mentioned prior-art magneto-optical recording and reproducing method which reproduces information from the information storage layer.

Referring to FIGS. 18A to 18G, the operation of this device will be described.

Figure 18A:
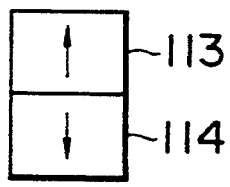
FIGS. 18A and 18G are diagrams for explaining the principle of an embodiment of the magneto-optical recording and reproducing method according to the present invention.
Figure 18B:
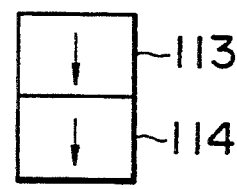

When the initializing field $H_{INI}$ (where $H_{c2} < H_{INI} < H_{c1}$, downward) is applied by the initializing field applying means 126 to the recording medium 121 at room temperature, the magnetization of the readout layer 114 is oriented in one direction (downward in this case) as shown in FIGS. 18A and 18B. At this time, because the information storage layer 113 has a large coercive force $H_{c1}$, the state of recorded magnetization is preserved, so that there exist upward and downward magnetized portions mixed.

Figure 18C:
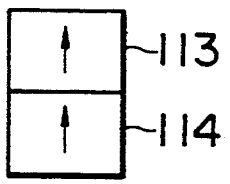
Figure 18D:
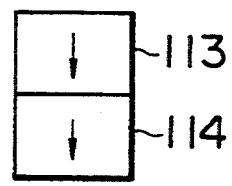
Figure 18E:
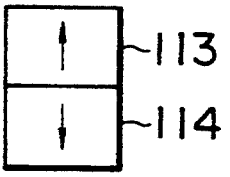
Figure 18F:
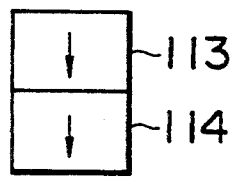

The magnetized directions immediately after information is recorded are as follows. In case a laser beam ($P_H$) of a high intensity was irradiated, owing to a resulting temperature rise, the magnetization of both the information storage layer 113 and the readout layer 114 disappear once, so that in the subsequent cooling process, the magnetization of both the information storage layer 113 and the readout layer 114 is oriented uniformly in the direction of the recording bias field $H_o$ (upward in this case), as illustrated in FIG. 18C. On the other hand, if the laser beam ($P_L$) of a low intensity was irradiated, only the magnetization of the information storage layer 113 disappears, so that in the ensuing cooling process, the magnetization of the information storage layer 113 is oriented to the same direction as the magnetization of the readout layer 114 by the exchange field from the readout layer 114. To be more specific, as shown in FIG. 18D, the magnetization of the information storage layer 113 is directed downward.

Figure 18G:
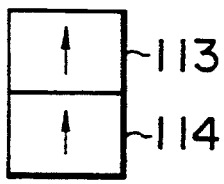

When information recorded as described is reproduced, the since the recording medium 121 continues rotating, the recording medium 121 is initialized again by the initializing field $H_{INI}$ before information is reproduced, and as shown in FIGS. 18A and 18B, only the magnetization of the readout layer 114 is directed downward. Then, while the readout bias field $H_R$ is applied, the readout beam is irradiated to the recording medium 121. The readout bias field $H_R$ has an intensity higher than that of the recording bias field $H_o$ and is directed in the opposite direction (downward). Owing to the effects of the exchange field from the information storage layer 113 in addition to the readout bias field $H_R$, a part of the magnetization of the readout layer 114 is reversed. At this time, in the portion (FIG. 18F) where the magnetization of the information storage layer is directed downward, that is to say, the magnetization is to be exchange-coupled with the readout layer 114 has already been directed downward, and therefore, is stable and its magnetized direction is not reversed. In consequence, only the magnetized direction of that portion of the readout layer 114 where the magnetization of the information storage layer 113 is directed upward (FIG. 18E) is reversed (FIG. 18G). As a result, the state of magnetization of the information storage layer 113 is copied to the readout layer 114.

Figure 23:
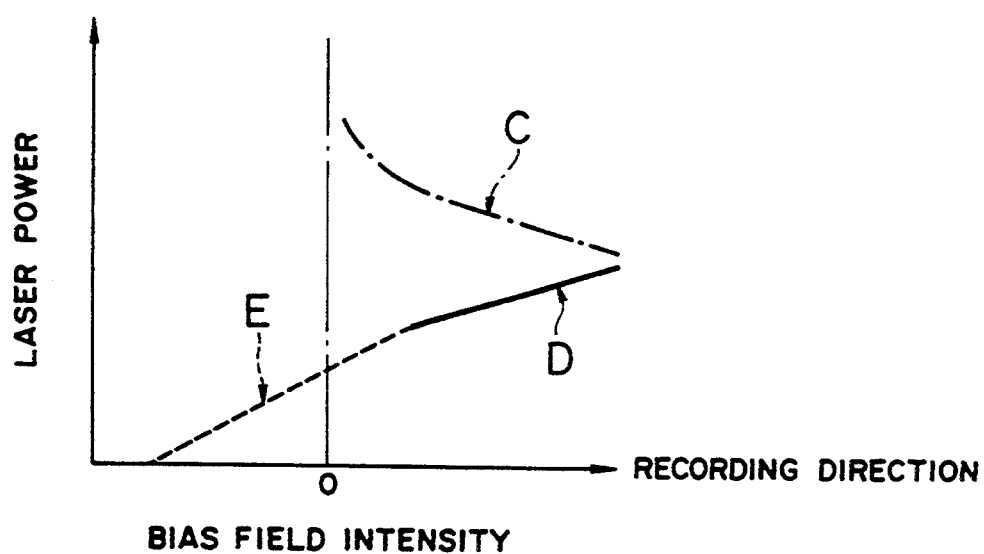
FIG. 23 is a graph showing the relation between the bias field intensity and the laser power in the magneto-optical recording and reproducing method in FIG. 1.

FIG. 23 shows the relation between the laser power and the bias field by which it is possible to record information by a recording beam ($P_H$) of a high intensity, and copy information about the magnetization of the readout layer 114 to the information storage layer 113 by a recording beam ($P_L$) of a low intensity, and copy information about the magnetization of the information storage layer 113 to the readout layer 114 by a readout beam on the recording medium 121 of this embodiment. From this graph, it is understood that when the bias field is a large and positive value, as the laser power is increased, as indicated by the curves D and C, the magnetization of the readout layer 114 is first copied to the information storage layer 113, and as the laser power is further increased, information starts to be recorded. It is also understood that when the bias field is relatively weak or a negative value (the bias field is in the opposite direction), as the laser power is increased, as indicated by the curve E, the magnetization of the information storage layer 113 is copied to the readout layer 114. FIG. 23 also shows that information is recorded by irradiation with a recording beam of a sufficiently high intensity, whatever value the bias field may be. Therefore, by changing the direction or the intensity of the bias field in recording or reproduction, the "recording the information" is compatible with the "copying the state of magnetization in reproducing information".

In this copy process, only a limited portion of the laser beam spot is utilized for reproduction, so that information recorded with high density can be reproduced with high resolution. The reason is as follows.

Figure 22:
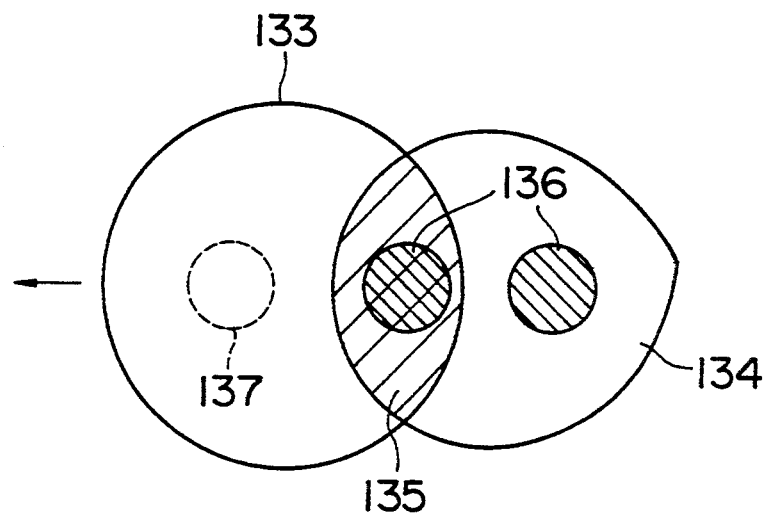
FIG. 22 is a diagram for explaining the principle of the magneto-optical recording and reproducing method in FIG. 1.

As shown in FIG. 22, the laser beam spot 133 irradiated to the recording medium 121 is moving relative to the recording medium 121, and therefore, the area where the temperature rises by irradiation with the readout beam is displaced a little from the position of the beam spot 133, in other words, is located to the rear of the spot in the direction of the relative motion. The overlapping area 35 between the thus formed temperature rise area 134, and the beam spot 133 when the temperature rises is the area where information can be reproduced, namely, the readout area. The information of the information storage layer 113 is copied to the domains within the temperature rise area 134. Out of the domains 136 to which information has been copied, the information of the only domain existing in the readout area is read out with the readout beam. Note that the domain 137 is a domain which does not have any information copied therein. Therefore, the effective beam spot that can be utilized for information reproduction is the readout area 135, and therefore, this is considered as equivalent to the contraction of the diameter of the laser beam spot 133, so that information can be reproduced with higher resolution than in the prior art. Consequently, even when information is recorded and reproduced with high density, a high S/N ratio can be obtained.

Figure 24:
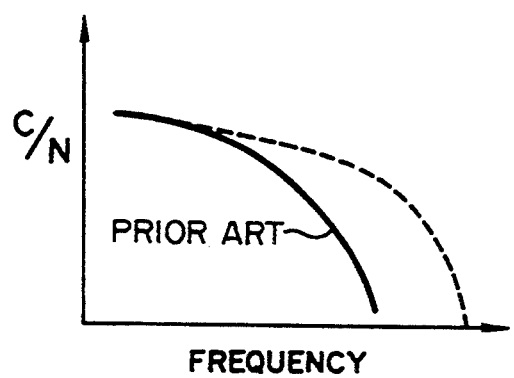
FIG. 24 is a graph showing the relation between the frequency and C/N in the magneto-optical recording and reproducing method in FIG. 1.

Using the magneto-optical recording medium 121 of this fourth embodiment, the frequency dependency of the information write/read characteristics were examined, the results of which are shown in FIG. 24. FIG. 24 also shows the results of the examination of the prior art in which the laser beam was irradiated from the side closer to the information storage layer without changing the direction of the bias field in reproduction. For this examination, the same recording medium as in this embodiment was used.

As is clear from FIG. 24, particularly notable in this embodiment compared with the prior art is a great improvement in the C/N (carrier-to-noise ratio) in recording with high density (high frequency). The improvement in the C/N at low frequencies indicates an improvement achieved in the Kerr rotation angle (Curie temperature).

Figure 25:
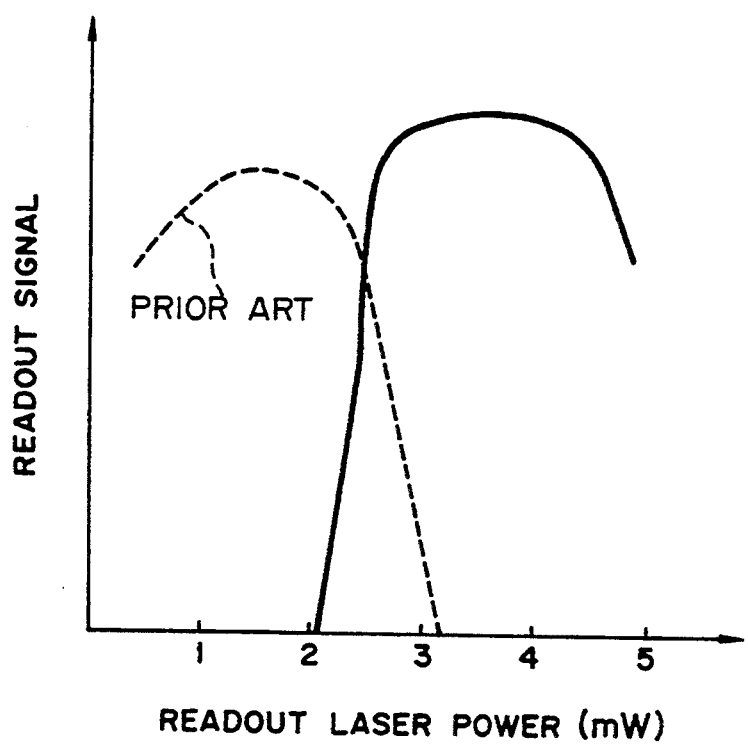
FIG. 25 is a graph showing the relation between the readout beam intensity and the readout signal output in the magneto-optical recording and reproducing method in FIG. 18.

FIG. 25 shows the relation between the readout laser power and the readout signal. Like in FIG. 24, FIG. 25 also shows the curve of the prior art. It is understood from FIG. 25 that in this embodiment, when the readout laser power is about 2 mW, copying is started, and when the laser power is about 3.5 mW, the maximum readout signal is obtained, and therefore, the about 3.5 mW is the optimum readout laser power. In this case, as for the desired recording laser power, preferably, the high-level laser power ($P_L$) is 6.6 mW, and the low-level laser power ($P_H$) is 3.3 mW.

In contrast to the prior art, in this embodiment, the readout signal does not drop in the range of high readout laser power. The reason for this is that the magnetized direction of the readout layer 114 and the information storage layer 113 is, in the copy operation, oriented in the direction in which they are to be exchange-coupled, so that stable erasing is difficult to achieve.

Therefore, in this embodiment, it is possible to irradiate the readout beam with a higher intensity than the erasing beam. In other words, even if the laser power at the start of erasing is reduced, information can be reproduced stably, so that the erasing laser power can be set in a wide range, and therefore, stable overwriting can be implemented without leaving the previous information unerased.

It ought to be noted that in this embodiment, the erasing start power and the recording start power are 2.5 mW and 5 mW, respectively.

(Fifth embodiment)

Figure 26:
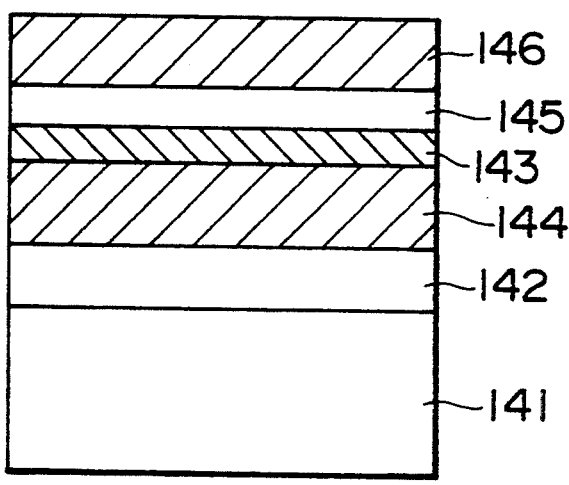
FIG. 26 is a sectional view of the magneto-optical recording medium according to the second embodiment of the present invention.

FIG. 26 shows the magneto-optical recording medium according to the fifth embodiment of the present invention. This recording medium is formed by laminating an $SiN_x$ film (80 nm thick) as a first dielectric layer 142, an amorphous alloy film (60 nm thick) of $Tb_{16}Dy_{17}Fe_{56}Co_{11}$ as a readout layer 144, an amorphous alloy film (30 nm thick) of $Tb_{22}Fe_{76}Co_2$ as an information storage layer 143, an $SiN_x$ film (20 nm thick) as a second dielectric layer 145, and an $AlTi_x$ film (60 nm thick) as a thermally diffusive layer 146 in this order onto the 5.25-inch transparent substrate 141 comprising glass or plastic having grooves for tracking formed in the surface thereof. The thermally diffusive layer 147 diffuses the heat by laser beam irradiation to prevent the recording film from being exposed to extremely high temperatures and help increase the number of writing times. This recording medium is manufactured as follows.

The transparent glass substrate 141 is mounted in the RF magnetron sputter chamber, the chamber is evacuated to a high degree of vacuum below 0.1 mPa, then, a mixed gas of Ar gas and $N_2$ gas is introduced, and reactive sputtering is performed under a gas pressure of 1.3 Pa using an Si target, by which the $SiN_x$ film to serve as the first dielectric layer 142 is laminated in a thickness of 80 nm.

After this, sputtering is again performed under an Ar gas pressure of 0.7 Pa using a TbDyFeCo as the target to laminate a 60 nm amorphous alloy film of $Tb_{16}Dy_{17}Fe_{56}Co_{11}$ as the readout layer 144 onto the $SiN_x$ film. Then, using a TbFeCo alloy as the target, sputtering is performed under an Ar gas pressure of 0.7 Pa to laminate a 30 nm amorphous alloy film of $Tb_{22}Fe_{76}Co_2$ onto the information storage layer 143. The information storage layer 143 and the readout layer 144 thus laminated are magnetically exchange-coupled to each other.

Then, the RF magnetron sputter chamber is again evacuated below 0.1 mPa, a mixed gas of Ar gas and $N_2$ gas is introduced, and reactive sputtering is performed under a gas pressure of 1.3 Pa using an Si target to laminate a 20 nm $SiN_x$ as the second dielectric layer 146 onto the amorphous alloy film of $Tb_{22}Fe_{76}Co_2$.

Further, sputtering is performed under an Ar gas pressure of 0.7 Pa using an Al—Ti alloy as the target to laminate a 60 nm $AlTi_x$ film as the $AlTi_x$ film as the thermally diffusive layer onto the $SiN_x$ film.

Figure 20A:
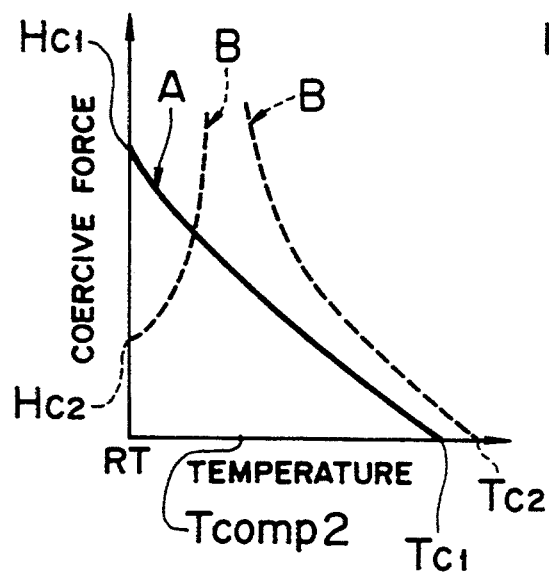
FIGS. 20A and 20B are diagram of magnetic characteristics of the magneto-optical recording medium according to the fourth and fifth embodiments of the present invention.
Figure 20B:
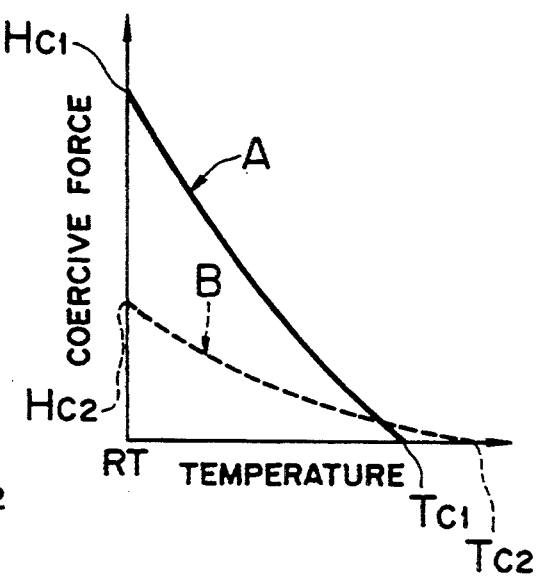

In the fifth embodiment, the Curie temperature $T_{c1}$ of the information storage layer 143 is 160° C., while the Curie temperature of the readout layer 144 is 250° C.; therefore, $T_{c1} < T_{c2}$. The coercive force $H_{c2}$ of the readout layer 144 is 3 kOe, while the coercive force $H_{c1}$ of the information storage layer 143 is 12 kOe; therefore, $H_{c2} < H_{c1}$. The magnetic characteristics shown in FIG. 20A are obtained by forming the information storage layer 143 by a transition-metal dominant alloy and the readout layer 144 by a rare-earth dominant alloy. Since the exchange field between the two layers is not so strong, the reversal of the magnetized direction of the information storage layer 143 and the readout layer 144 occurs independently.

On the recording medium of the fifth embodiment, information was recorded and reproduced by using the same magneto-optical recording and reproducing device as in the fourth embodiment. As a result, overwriting could be performed as in the fourth embodiment. In recording, while applying a bias field $H_o$ of about 500 Oe to the recording medium, information was recorded by irradiation with the recording beam, and then the magnetization information was reproduced by irradiating the readout laser beam 129 (wavelength 879 nm) to the recording medium while applying the readout bias field $H_R$ of about 500 Oe, by which the magnetized direction of the information storage layer 143 could be copied to the readout layer 144. Hence, like in the fourth embodiment, information recorded with high density can be reproduced at high resolution.

The frequency dependency of the write/read characteristics (C/N) was examined using the magneto-optical recording medium of the fifth embodiment, and it was found that the frequency dependency is substantially the same as that of the first embodiment shown in FIG. 24.

Figure 27:
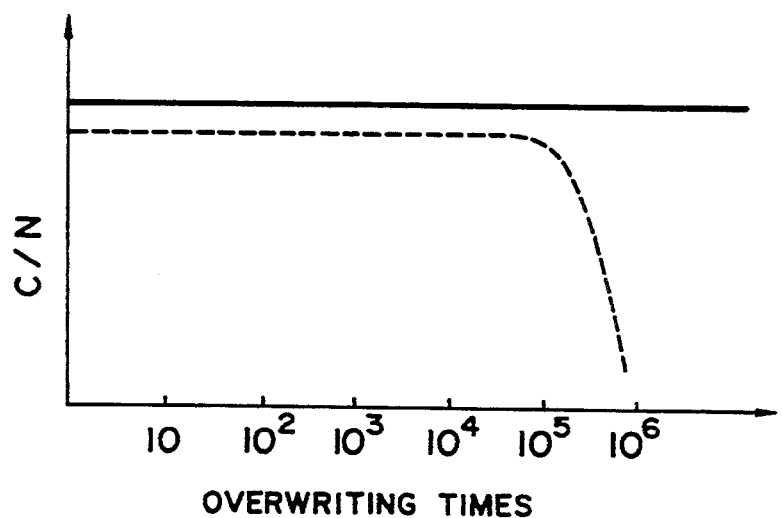
FIG. 27 is a graph showing the relation between the number of times of overwriting and C/N in the magneto-optical recording and reproducing method according to one other embodiment of the present invention using the magneto-optical recording medium according to the second embodiment.
Figure 28:
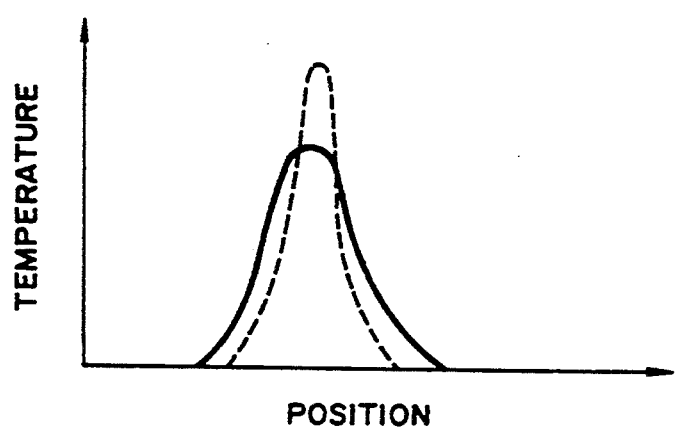
FIG. 28 is a graph showing the relation between the position on the medium and temperature in the magneto-optical recording and reproducing method according to the other embodiment of the present invention using the magneto-optical recording medium according to the second embodiment.
Figure 29:
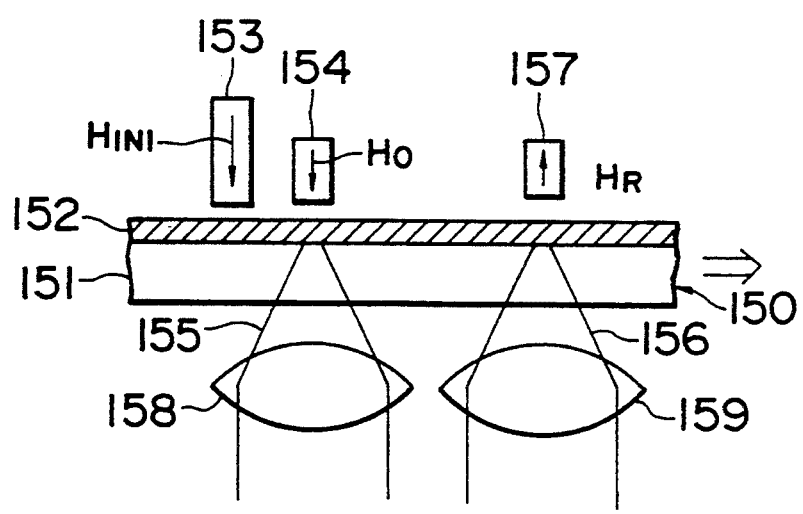
FIG. 29 is a diagram for explaining the principal portion of an embodiment of the magneto-optical recording and reproducing device according to the present invention.

In addition, the fifth embodiment has an advantage that as shown in FIG. 27, the write/read characteristics (C/N) does not deteriorate even if overwriting is performed repeatedly in contrast to the case in which the thermally diffusive layer is not provided. Since the fifth embodiment has the thermally diffusive layer 146, as shown in FIG. 28, the temperature distribution on the information storage layer 143 and the readout layer 144 is more uniform than the case where there is no thermally diffusive layer, so that those two layers 143 and 144 are prevented from being exposed to excessively high temperatures.

(Sixth embodiment)

FIG. 12 shows another embodiment of the magneto-optical recording and reproducing device according to the present invention. A recording medium 150 used in this device is formed by laminating a writing layer 152 composed as in the earlier-mentioned third embodiment to a disc-shaped substrate 151. This device comprises initializing field applying means 153 for applying the initializing field $H_{INI}$ (4 kOe, downward) to the recording medium 150, recording bias field applying means 154 for applying the recording bias field $H_o$ (0.5 kOe, downward) to the recording medium 150, and readout bias field applying means 157 for applying the readout bias field $H_R$ (1 kOe, upward) to the recording medium 150. Those field applying means 153, 154, and 157 are each formed by a permanent magnet, and also include a lens 155 for focusing a recording beam 155, and a lens for focusing a readout beam 156.

The differences of this device from the fourth embodiment mentioned above are that the recording beam 155 and the readout beam 156 are focused by separate lenses, that the recording bias field applying means 154 and the readout bias field applying means 157 are each formed by a permanent magnet, and that the initializing field $H_{INI}$ and the recording bias field $H_o$ are both directed downward, and the readout bias field $H_R$ is directed upward.

The recording medium 150 passes under the initializing field applying means 153, the recording bias field applying means 154, and the readout bias field applying means 157 successively. The recording medium is initialized by the initializing field $H_{INI}$ under the initializing field applying means 153, the readout layer 114 in the writing layer 152 is magnetized in the same direction as the direction of the initializing field $H_{INI}$. Then, while the recording bias field $H_o$ is applied under the bias field applying means 112, information is recorded on the medium 150 by the recording beam 155 whose intensity has been modulated according to information.

When reading the recorded information, the readout layer 114 is first magnetized in one direction by the initializing field $N_{IHI}$, then the recording bias field $H_o$ is applied. Since the intensity of the readout beam is arranged so as to be sufficiently small, the recorded information is not destroyed. Subsequently, using the readout bias field $H_R$ and the readout beam 156, information in the information storage layer 113 is copied to the readout layer 114.

Figure 30:
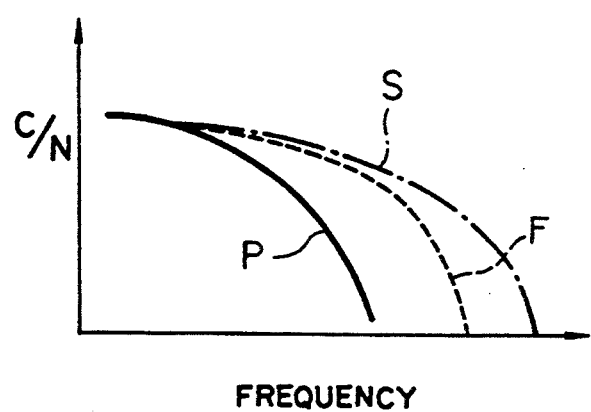
FIG. 30 is a graph showing the relation between the frequency and C/N obtained by the magneto-optical recording and reproducing device in FIG. 12.

In the sixth embodiment, the readout resolution has been improved by arranging for the wavelength of the readout beam 156 to be 530 nm and for the wavelength of the recording beam 152 to be 780 nm. Therefore, it was found that as shown in FIG. 30, the write/read characteristics (C/N) have been extended to a much higher frequency range than in the first and fifth embodiments, so that the write/read operations can be performed with higher density.

In this sixth embodiment, the lens 158 for focusing the recording beam 155 and the lens 159 for focusing the read after write beam (readout beam) 156 are provided separately. Therefore, the beams of different wavelengths can be handled by the completely separate optical systems, which arrangement offers an advantage that the device configuration can be simplified. Moreover, the magnetic field need not be reversed at all, so that the device can be made in a reduced size.

By using the magneto-optical recording method and the magneto-optical recording medium according to the present invention, a greater S/N ratio in reproduction can be obtained than in the prior art without deterioration of the information recording characteristics.

By using the overwritable magneto-optical recording and reproducing method, the magneto-optical recording and reproducing device and the magneto-optical recording medium for use with the same method according to the present invention, a sufficient S/N ratio (25 dB, for example) can be obtained for writing and reading information with high density (about 1.5 Gb/in², for example).

What is claimed is:

1. A magneto-optical recording medium comprising:
an information storage layer, a read control layer and a readout layer formed on a substrate, said information storage layer being used for recording information by changing the magnetized state thereof by raising the temperature thereof by irradiation of light, said readout layer being capable of copying thereto information recorded in said information storage layer, being disposed on a position closer to the substrate than the information storage layer, having a coercive force of 3 kOe equal or less at room temperature, and exhibiting a greater magneto-optical effect than said information storage layer, said read control layer being disposed between said information storage layer and said readout layer, for magnetically coupling said readout layer with said information storage layer and for magnetically decoupling said readout layer from said information storage layer.

2. A magneto-optical recording medium according to claim 1, wherein the coercive force of said readout layer is 1 Koe equal or less at room temperature.

3. A magneto-optical recording medium according to claim 1, wherein the thickness of said readout layer is in a range of 15 nm or more and 60 nm or less.

4. A magneto-optical recording medium according to claim 1, wherein the thickness of said read control layer is in a range of 2 nm or more and 20 nm or less.

5. A magneto-optical recording medium according to claim 1, wherein said read control layer is formed by a magnetic layer having a Curie temperature lower than said writing temperature and higher than said readout temperature.

6. A magneto-optical recording medium according to claim 1, wherein said information storage layer includes a writing layer being initialized by the initializing magnetic field and has a small coercive force at room temperature, and a memory layer having a large coercive force at room temperature; and wherein said memory layer is contiguous to said read control layer.

7. A magneto-optical recording medium according to claim 6, wherein a magnetic layer can also be provided for initializing said writing layer by being magnetized uniformly in one direction.

8. A magneto-optical recording medium according to claim 7, wherein said magnetic layer for initialization includes an initializing layer whose magnetization is not reversed by a writing operation, and an initialization control layer for magnetically coupling said initializing layer to said writing layer at said readout temperature, and magnetically decoupling said initializing layer from said writing layer at said writing temperature.

9. A magneto-optical recording medium in claim 1, further comprising: means for irradiating said magneto-optical recording medium with a light having an intensity greater or equal to that which changes the magnetized direction of said readout layer in reproduction but less than that which changes the magnetized state of said information storage layer.

* * * * *